:::: {.col}
(12) United States Patent
Thomas et al.
::::

:::: {.col}
(10) Patent No.: US 11,655,349 B2
(45) Date of Patent: May 23, 2023
::::

(54) TWO-COMPONENT POLYURETHANE OR POLYISOCYANURATE LOW PRESSURE SPRAY FOAM COMPOSITION CONTAINING A GASEOUS BLOWING AGENT COMPRISING PRESSURIZED CARBON DIOXIDE

(71) Applicant: DDP SPECIALTY ELECTRONIC MATERIALS US, LLC, Wilmington, DE (US)

(72) Inventors: Megan Marie Thomas, Midland, MI (US); Kyoung Moo Koh, Midland, MI (US); Mark Alan Rickard, Midland, MI (US)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 518 days.

(21) Appl. No.: 16/815,275

(22) Filed: Mar. 11, 2020

(65) Prior Publication Data

US 2020/0308362 A1 Oct. 1, 2020

Related U.S. Application Data

(60) Provisional application No. 62/816,467, filed on Mar. 11, 2019.

(51) Int. Cl.

| | |
|---|---|
| *C08J 9/12* | (2006.01) |
| *C08G 18/06* | (2006.01) |
| *C08J 9/14* | (2006.01) |
| *C08G 18/40* | (2006.01) |
| *C08G 18/42* | (2006.01) |
| *C08G 18/48* | (2006.01) |
| *C08G 18/76* | (2006.01) |
| *C09D 5/02* | (2006.01) |
| *C09D 175/08* | (2006.01) |
| *C08G 101/00* | (2006.01) |

(52) U.S. Cl.
CPC .......... *C08J 9/144* (2013.01); *C08G 18/4018* (2013.01); *C08G 18/4208* (2013.01); *C08G 18/48* (2013.01); *C08G 18/7671* (2013.01); *C08J 9/122* (2013.01); *C08J 9/127* (2013.01); *C08J 9/146* (2013.01); *C09D 5/021* (2013.01); *C09D 175/08* (2013.01); *C08G 2101/00* (2013.01); *C08J 2201/02* (2013.01); *C08J 2201/022* (2013.01); *C08J 2203/06* (2013.01); *C08J 2203/162* (2013.01); *C08J 2203/164* (2013.01); *C08J 2207/04* (2013.01); *C08J 2375/04* (2013.01); *C08J 2375/08* (2013.01)

(58) Field of Classification Search
CPC ................ C08J 2375/04; C08J 2375/08; C08J 2203/182; C08J 2205/052; C08G 2110/0025; C08G 2110/005; C08G 18/2081; C08G 18/24; C08G 18/302; C08G 18/381; C08G 18/667; C08G 18/7664; C08G 18/12; C08K 5/0066; C08K 5/54

See application file for complete search history.

(56) References Cited

U.S. PATENT DOCUMENTS

| | | | |
|---|---|---|---|
| 7,655,610 B2 | 2/2010 | Singh et al. | |
| 8,962,707 B2 | 2/2015 | Singh et al. | |
| 2005/0241805 A1 | 11/2005 | Singh et al. | |
| 2012/0059076 A1* | 3/2012 | Olang | B29C 44/3442 521/76 |
| 2014/0117270 A1* | 5/2014 | Yin | C08G 18/7664 252/62 |
| 2016/0130416 A1* | 5/2016 | Chen | C08J 9/0061 521/128 |
| 2017/0369668 A1* | 12/2017 | Chen | C08G 18/7664 |
| 2018/0022885 A1 | 1/2018 | Younes et al. | |
| 2018/0079881 A1 | 3/2018 | Zhang et al. | |
| 2018/0085766 A1 | 3/2018 | Gantenbein et al. | |
| 2018/0105633 A1 | 4/2018 | Van der Puy et al. | |
| 2020/0048397 A1 | 2/2020 | Van der Puy et al. | |

FOREIGN PATENT DOCUMENTS

| | | |
|---|---|---|
| TW | 201838957 A | 11/2018 |
| WO | 2016/162362 A1 † | 10/2016 |
| WO | 2016164671 A1 | 10/2016 |

OTHER PUBLICATIONS

International Search Report and Written Opinion in International Application No. PCT/US2020/022007, dated Jun. 8, 2020.

\* cited by examiner
† cited by third party

*Primary Examiner* — Kara B Boyle

(57) ABSTRACT

Storage-stable two-component polyurethane or polyisocyanurate spray foam compositions are disclosed, said compositions comprising: (a) an A-side component comprising one or more polyisocyanate and one or more blowing agent; and (b) a B-side component comprising one or more polyol and one or more blowing agent comprising pressurized gaseous carbon dioxide and one or more liquid blowing agent; wherein both the A-side component and the B-side component, separately, generate less than 300 ppm of fluoride ion after one week of aging at 50° C.

20 Claims, No Drawings

TWO-COMPONENT POLYURETHANE OR POLYISOCYANURATE LOW PRESSURE SPRAY FOAM COMPOSITION CONTAINING A GASEOUS BLOWING AGENT COMPRISING PRESSURIZED CARBON DIOXIDE

FIELD OF THE INVENTION

Described herein are two-component (A-side and B-side) polyurethane or polyisocyanurate spray foam compositions comprising a gaseous blowing agent comprising pressurized gaseous carbon dioxide ($CO_2$) in either the B-side component, or in both the A-side component and the B-side component, as well as one or more liquid blowing agent in either the B-side component, or in both the A-side component and the B-side component, which compositions utilize blowing agents having a low global warming potential, and wherein both the A-side component and the B-side component have good shelf life stability. Furthermore, methods of making and using these two-component compositions are described herein. The compositions disclosed herein can be used, for example, as expandable foams for air sealing and gap filling, or for insulation, and/or other home and industrial applications.

BACKGROUND OF THE INVENTION

Two-component compositions are often used for reactive systems that cannot be stored and/or transported together in one mixed composition. Commercially, such two-component compositions containing one or more blowing agent may function to generate an in-situ reaction and formation of a stable foam, which can be utilized to fill space including air gaps in construction structures. Two-component polyurethane or polyisocyanurate spray (2C-SPU) foam compositions find utility in such applications (air sealing and gap filling) and are typically applied by simultaneously feeding an isocyanate component (A-side component) with a polyol component (B-side component) to create a mixture and then spraying the mixture from a dispenser (or effect mixing during the spraying operation), wherein the A-side component typically comprises one or more monomeric isocyanate, polymeric isocyanate, or a blend of the two, and, optionally, one or more blowing agent and/or surfactant; and the B-side component typically comprises one or more polyol, blowing agent, catalyst, surfactant, and, optionally, flame retardant.

2C-SPU foam systems are generally classified into two classes: those that contain a gaseous blowing agent (GBA) in one or both of the A and B component, and those that are free of GBA in the A and B components ("GBA-Free 2C-SPU foam systems"). GBAs are blowing agents that have a vapor pressure greater than 0.23 Mega Pascals (MPa) at 25 degrees Celsius (° C.). Typical conventional GBAs include lower alkanes such as butane(s), pentane(s); as well as many halogenated or partially halogenated lower alkanes (for example, 1-6 carbon halogenated alkanes) such as trichlorofluoromethane (CFC-11), dichlorodifluoromethane (CFC-12), 1,1,2,2-tetrafluoroethane (HFC-134), and 1,1,1,2-tetrafluoroethane (HFC-134a). GBAs are beneficial in a 2C-SPU not only as frothing aids but also act as a propellant and to lower the viscosity of the component they are in. Lower viscosity components are easier to dispense because they require less pressure to flow through flow channels of a dispenser.

GBA-Free 2C-SPU foam systems require the use of either a positive displacement pumping system to meter the two components into the spray gun, or a pressurized gas as a discrete third feed concomitant with the A and B components when dispensing the 2C-SPU foam system. The requirement of a pressurized gas means that a dispenser requires at least three simultaneous feeds as opposed to two feeds for 2C-SPU foam systems containing GBA.

GBA-Free 2C-SPU foam systems can be classified as either high pressure systems or low pressure systems. In high pressure systems, which herein are systems that require dispensing pressures greater than 4 Mega Pascals (MPa), positive displacement pumps as described above enable metering, help shape the spray and can be used to clean the dispensing spray head used to dispense the 2C-SPU. In low pressure systems, which herein are systems that can be dispensed at pressures of 4 MPa (580 psig) and lower, typically lower than 2 MPa (290 psig), a third feed pressurized gas (for example nitrogen or air) is used as a motive and mixing force for the A and B components.

Generally, the dispensing operation is more convenient using a low pressure 2C-SPU foam system which includes GBAs since it is less complex than GBA-free low pressure systems and avoids the use of expensive and mechanically complex dispensing hardware that are required for GBA-free high pressure systems. However, due to the higher flammability of the lower alkanes (butane, pentane, etc.) and the increasing regulatory pressure on incumbent blowing agents such as chlorofluorocarbons and hydrofluorocarbons (including CFC-11, CFC-12, HFC-134 and HFC-134a) in the global market, hydrohaloolefins (HHO), such as hydrofluoroolefins (HFO), are now being considered as alternative blowing agents since they offer a low global warming potential (GWP). Hydrohaloolefins include hydrochlorofluoroolefins, such as 1-chloro-3,3,3-trifluoropropene (1233zd(E)), as well as hydrofluoroolefins such as trans 1,3,3,3-tetrafluoropropene (1234ze(E)), 2,3,3,3-tetrafluoroprop-1-ene (1234yf) and 1,1,1,4,4,4-hexafluorobut-2-ene (1336mzzm(Z)). Unfortunately, development of polyurethane and polyisocyanurate formulations with hydrohaloolefin blowing agents, including hydrofluoroolefins, is a big challenge because of shelf-life stability issues caused by side reactions between current catalysts and HHO (for example, HFO) blowing agents (gaseous and/or liquid HHO blowing agents). Typical shelf life stability for conventional HFC-containing formulations is at least 15 months, however the shelf life stability of current HFO-containing formulations is generally less than 2 months. It is considered that the commercial products should have at least a 12 month shelf life stability.

Various approaches to circumvent this problem have been explored, including the addition of hydrocarbons as a blowing agent in place of hydrofluorocarbons, but it would seem that this approach may be limited, at least in terms of quantities, due to the high flammability of hydrocarbons. Another approach has seen efforts to use non-amine catalysts in the B-side component (see, for example, United States Patent Application Publication No. 2018/0105633 A1), but to date this approach has not gained traction because most non-amine catalysts have the same problem of instability with the HHO blowing agents, and no replacement catalyst has been identified that matches the reactivity of the blowing chemistry in low NCO index formulations that was obtainable with amine catalysts. A similar approach focuses on minimizing or eliminating any amine content in the B-side component to an extent, for example, such that the nitrogen content in the B-side component is less than 1% nitrogen as a % of the B-side component formulation (see, for example, WIPO Patent Publication No. 2016/164671 A1).

There appears to be a sufficient interest in replacing hydrohalocarbons (such as hydrofluorocarbons) with much lower global warming potential blowing agents, but to date attempts to formulate low pressure two-component polyurethane or polyisocyanurate spray foam compositions have not met with success.

Therefore, there is a need for two-component polyurethane or polyisocyanurate spray foam compositions containing one or more low global warming potential blowing agent which have improved shelf life, and capable of producing stable foams comparable to those produced using current formulations (with hydrofluorocarbon blowing agents). The invention is directed to these, as well as other, important ends.

SUMMARY OF THE INVENTION

The invention provides two component polyurethane or polyisocyanurate low pressure spray foam compositions containing a gaseous blowing agent comprising pressurized gaseous carbon dioxide ($CO_2$) in either the B-side component, or in both the A-side component and the B-side component, as well as one or more liquid blowing agent in either the B-side component, or in both the A-side component and the B-side component, which compositions utilize blowing agents having a low global warming potential, and wherein both the A-side component and the B-side component have good shelf life stability. The "A" side component of the formulations comprises one or more polyisocyanate and one or more A-side blowing agent, which may be or may comprise pressurized gaseous $CO_2$, and, optionally, one or more liquid blowing agent and/or surfactant. The "B" side component of the formulations comprises one or more polyol, one or more catalyst, and one or more B-side gaseous blowing agent which is or comprises pressurized gaseous $CO_2$, as well as one or more liquid blowing agent. Optionally, the "B" side component of the formulation may further comprise one or more surfactant, and/or one or more flame retardant.

Catalysts capable of promoting the reaction between polyol and isocyanate to form urethane linkages can be defined as gelation catalysts (or gelling catalysts). The gelling catalysts in low pressure spray foam formulations can be metal complexes with nucleophilic ligands or potassium carboxylate salts. The potassium carboxylate salt also may be used as a trimerization catalyst which promotes a condensation reaction of three isocyanate groups to generate an isocyanurate moiety. Amine-based catalysts can accelerate the reaction between water and isocyanate to produce carbon dioxide and urea, and are known as blowing catalysts (while also contributing to the gelling reaction). However, it should be noted that $CO_2$ produced in this manner is insufficient to act as a blowing agent.

Since most catalysts react with the polyisocyanate or cause reaction of the polyisocyanate with itself, the catalysts are conventionally formulated in with the polyol (included in the B-side component). When either the metal catalyst (gelling catalyst) or the amine based catalyst (blowing catalyst), or both, are in the presence of an hydrohaloolefin, which is proposed as a replacement blowing agent, an undesirable side reaction generally occurs with the hydrohaloolefin blowing agent (such as, for example, a hydrofluoroolefin, HFO, blowing agent), resulting in slower reactivity times that worsen upon aging. In addition, fluoride ions can be released, which can further react with formulation components such as silicone surfactants and/or catalysts leading to poor foaming characteristics. Accordingly, the straight drop-in addition of HHO/HFO blowing agents in place of the hydrocarbon, chlorofluorocarbon or hydrofluorocarbon blowing agents is problematic. The present invention utilizes $CO_2$ as the GBA in the B-side component. The use of $CO_2$ as a blowing agent has historically been viewed as problematic. As noted above, the in-situ formation of $CO_2$ (via reaction of water with isocyanate) is insufficient to function as a blowing agent.

In one embodiment, the invention relates to a composition comprising, consisting of, or consisting essentially of a storage-stable two-component polyurethane or polyisocyanurate spray foam composition comprising: (a) an A-side component comprising one or more polyisocyanate and one or more blowing agent; and (b) a B-side component comprising one or more polyol and one or more blowing agent comprising pressurized gaseous carbon dioxide and one or more liquid blowing agent, wherein both the A-side component and the B-side component, separately, generate less than 300 ppm of fluoride ion after one week of aging at 50° C.

In an embodiment, the pressurized gaseous carbon dioxide in the B-side component is present at a level of from 0.5 wt. % to 10 wt. % carbon dioxide, based on the total weight of the B-side component.

In an embodiment, the pressurized gaseous carbon dioxide in the B-side component provides a pressure of from 0.14 MPa to 4.00 MPa (21 psig to 580 psig) on the B-side component as measured at ambient temperature.

The invention also provides a method of providing a space filling layer or space filling volume adjacent to or on a surface, the method comprising:

(a) providing a foamable composition comprising:
(i) an A-side component comprising one or more polyisocyanate and one or more blowing agent; and (ii) a B-side component comprising one or more polyol and one or more blowing agent comprising pressurized gaseous carbon dioxide and one or more liquid blowing agent; wherein both the A-side component and the B-side component, separately, generate less than 300 ppm of fluoride ion after one week of aging at 50° C.;
(b) applying a foamed sample, or pre-foamed sample that generates a foamed sample, of the foamable composition to said surface; and
(c) allowing the foamed sample of foamable composition to cure to a foam having a density of less than 48 $kg/m^3$.

In an embodiment of the method, the pressurized gaseous carbon dioxide in the B-side component is present at a level of from 0.5 wt. % to 10 wt. % carbon dioxide, based on the total weight of the B-side component.

In an embodiment of the method, the pressurized gaseous carbon dioxide in the B-side component provides a pressure of from 0.14 MPa to 4.00 MPa (21 psig to 580 psig) on the B-side component as measured at ambient temperature.

In some embodiments, the foam produced upon mixing the A-side and B-side components can be used in air sealing or gap filling applications, such as, for example, a sealant or insulation foam.

DETAILED DESCRIPTION OF THE INVENTION

The present invention can be understood more readily by reference to the following detailed description, examples, and claims, and their previous and following description.

However, it is to be understood that this invention is not limited to the specific compositions, articles, devices, systems, and/or methods disclosed unless otherwise specified, and as such, of course, can vary. While aspects of the present invention can be described and claimed in a particular statutory class, such as the composition of matter statutory class, this is for convenience only and one of skill in the art will understand that each aspect of the present invention can be described and claimed in any statutory class.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading or in any portion of the disclosure may be combined with embodiments illustrated under the same or any other heading or other portion of the disclosure.

Any combination of the elements described herein in all possible variations thereof is encompassed by the invention unless otherwise indicated herein or otherwise clearly contradicted by context.

Unless otherwise expressly stated, it is in no way intended that any method or aspect set forth herein be construed as requiring that its steps be performed in a specific order. Accordingly, where a method claim does not specifically state in the claims or description that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification. It is to be understood that both the foregoing general description and the following detailed description are exemplary and explanatory only and are not restrictive.

All publications mentioned herein are incorporated herein by reference to disclose and describe the methods and/or materials in connection with which the publications are cited.

It is to be understood that the terminology used herein is for the purpose of describing particular aspects only and is not intended to be limiting. Unless defined otherwise, all technical and scientific terms used herein have the same meaning as commonly understood by one of ordinary skill in the art to which this invention belongs. In this specification and in the claims which follow, reference will be made to a number of terms which are defined herein.

As used in the specification and the appended claims, the singular forms "a," "an" and "the" include plural referents unless the context clearly dictates otherwise.

As used herein, the term "and/or" means "and, or as an alternative".

As used herein, the terms "optional" or "optionally" mean that the subsequently described event, condition, component, or circumstance may or may not occur, and that the description includes instances where said event, condition, component, or circumstance occurs and instances where it does not.

As used herein, the phrase "sufficient to" (e.g., "conditions sufficient to") refers to such a value or a condition that is capable of performing the function or property for which a sufficient value or condition is expressed. As will be pointed out below, the exact value or particular condition required may vary from one embodiment to another, depending on recognized variables, such as the materials employed and/or the processing conditions.

The term "by weight," when used in conjunction with a component, unless specifically stated to the contrary, is based on the total weight of the formulation or composition in which the component is included. For example, if a particular element or component in a composition or article is said to be present in an amount of 8% by weight (or 8 wt. %), it is understood that this percentage is in relation to a total compositional percentage of 100%. In some instances, the weight percent of a component is based on the total weight of the composition "on a dry basis," which indicates the weight of the composition without water (e.g., less than about 1%, less than about 0.5%, less than about 0.1%, less than about 0.05%, or about 0% of water by weight, based on the total weight of the composition). For elements or components that are not expressed as a percentage, the parts by weight may or may not sum to 100 parts. They are simply listed as number of parts in a relative amount compared to the total number of parts.

In normal usage the term "ambient temperature" is a range of temperatures (for example, 20° C. to 25° C.). Herein, when used as a condition to measure a property, it is used to mean 22° C. (71.6 F).

When disclosing numerical values herein, for example, 1, 2, 3, 4, 5, 6, 7, 8, 9, 10, the following sentence typically follows such numerical values: "Each of the foregoing numbers can be preceded by the term 'about,' at least about,' or 'less than about,' and any of the foregoing numbers can be used singly to describe an open-ended range or in combination to describe a closed-ended range." This sentence means that each of the aforementioned numbers can be used alone (e.g., 4), can be prefaced with the word "about" (e.g., about 8), prefaced with the phrase "at least about" (e.g., at least about 2), prefaced with the phrase "less than about" (e.g., less than about 7), or used in any combination with or without any of the prefatory words or phrases to define a range (e.g., 2 to 9, about 1 to 4, 8 to about 9, about 1 to about 10, and so on). Moreover, when a range is described as "about X or less," this phrase is the same as a range that is a combination of "about X" and "less than about X" in the alternative. For example, "about 10 or less" is the same as "about 10, or less than about 10." Such interchangeable range descriptions are contemplated herein. Other range formats are disclosed herein, but the difference in formats should not be construed to imply that there is a difference in substance.

The use of numerical values in the various quantitative values specified in this application, unless expressly indicated otherwise, are stated as approximations as though the minimum and maximum values within the stated ranges were both preceded by the word "about." In this manner, slight variations from a stated value may be used to achieve substantially the same results as the stated value. Also, the disclosure of ranges is intended as a continuous range including every value between the minimum and maximum values recited as well as any ranges that may be formed by such values. Also disclosed herein are any and all ratios (and ranges of any such ratios) that may be formed by dividing a recited numeric value into any other recited numeric value. Accordingly, the skilled person will appreciate that many such ratios, ranges, and ranges of ratios may be unambiguously derived from the numerical values presented herein and in all instances such ratios, ranges, and ranges of ratios represent various embodiments of the present invention.

As used herein, the term "substantially free of" refers to a composition having less than about 1% by weight, e.g., less than about 0.5% by weight, less than about 0.1% by weight, less than about 0.05% by weight, or less than about 0.01% by weight of the stated material, based on the total weight of the composition.

As used herein, the term "substantially," when used in reference to a composition, refers to at least about 60% by weight, e.g., at least about 70%, at least about 80%, at least about 90%, at least about 95%, at least about 98%, at least about 99%, or about 100% by weight, based on the total weight of the composition, of a specified feature or component.

The hydroxyl (OH) number is a measure of the amount of reactive hydroxyl groups available for reaction. The OH number is determined by ASTM D 4274-88. All equivalent weights of polyols disclosed herein are obtained from the formula using OH number:

$$\text{Equivalent Weight of polyol (in } g/equiv.) = \frac{56.1 \times 1000}{OH \text{ number}}$$

The % NCO is a measure of the amount of reactive isocyanate group content for reaction. The % NCO is determined by ASTM D 2575-97. All equivalent weights of polymeric MDI, p(MDI), disclosed herein are obtained from the formula using % NCO:

$$\text{Equivalent Weight of } p \text{ (MDI) (in } g/equiv.) = \frac{4202}{\% \text{ NCO}}$$

As used herein, and as used in the art, the isocyanate (NCO) index of a polyurethane or polyisocyanurate foam formulation is the amount of isocyanate groups (actual) in the formulation divided by the amount of isocyanate groups (theoretical) required to react with the available polyol —OH groups in the formulation. The ratio is multiplied by 100 such that an index of 100 corresponds to a stoichiometric equivalent amount of —NCO and —OH (and an index of greater than 100 would equate to an excess of isocyanate). The formulation index may vary widely depending on the desired properties and end-use of the foam. For example, flexible polyurethane foams may have a formulation index of from 30 to 100 and rigid polyurethane foams more typically from 100 to 250. The index for a polyisocyanurate (rigid) foam formulation is usually considerably higher, usually above 250, such as from about 250 to about 400.

Generally, polyurethanes are produced by reacting an isocyanate containing two or more isocyanate groups per molecule (R—(N═C═O)n), i.e., a polyisocyanate, with a polyol containing on average two or more hydroxyl groups per molecule (R'—(OH)n); the polymerization reaction makes a polymer containing the urethane linkage, —RNHCOOR'—. At room temperature, the reaction between the polyisocyanate and the polyol starts almost instantaneously, and so the two components are not stored together prior to the desired foaming process. Typically, they are stored as an A-side component containing polyisocyanate, and a B-side component containing the polyol. Typically, for the formation of free-standing or space-filling foams, catalysts are used to optimize the balance of blowing and gelation of the foam. In formulating the NCO index greater than 200, a trimerization catalyst can be added to the B-side component. The catalysts may include, for example, one or more amine as a blowing catalyst, for example, tertiary amines, such as 1,4-diazabicyclo[2.2.2]octane (DABCO) or 1,8-diazabicyclo[5.4.0]undec-7-ene (DBU) or $N^1$-(2-(dimethylamino)ethyl)-$N^2$,$N^2$-dimethylethane-1,2-diamine as well as one or more metallic compound or one or more carboxylate salt as a gelation catalyst (or gelling catalyst), such as dibutyltin dilaurate or tin octanoate (tin carboxylates or dialkyltin dicarboxylates, generally) or bismuth octanoate or potassium octanoate or potassium pivalate. The potassium carboxylate salts also can work as a trimerization catalyst in formulations where the NCO index is desired to be greater than 200. Since most catalysts react with the polyisocyanate or cause reaction of the polyisocyanate with itself, the catalysts are conventionally formulated in with the polyol (included in the B-side component). For convenience, then, all other formulation ingredients are usually included in the B-side component. As an exception, a blowing agent is usually located in both the A-side component and the B-side component. The A-side component is conventionally limited to just the one or more polyisocyanate, optionally, with one or more blowing agent and/or surfactant.

Polyisocyanurate foams are produced from similar starting materials and formulation ingredients to those used to produce polyurethane foams except that the proportion of isocyanate is higher. However, the resulting chemical structure of the polyisocyanurate is significantly different, with the isocyanate groups trimerizing to form the 6-membered (alternating —C—N—) isocyanurate ring structure having N-pendant polyol groups, which link to further isocyanurate groups.

In both cases (polyurethane foams and polyisocyanurate foams), the A-side and B-side components are packaged and stored in separate containers or stored in separate compartments within the same container. The A-side component formulation and the B-side component formulation usually are kept separate and delivered through separate lines into a dispensing unit, which typically effects the mixing and dispensing of the two components in combination in the form of a spray.

Global warming potential (GWP) is a measure of how much heat a greenhouse gas traps in the atmosphere up to a specific time horizon, relative to carbon dioxide. Commonly, a time horizon of 100 years is used by regulators (and, unless otherwise stated, is used herein when referring to GWP values for specific gases). For example, a GWP value of 500 for a particular gas indicates that the gas would trap 500 times more heat than the equivalent mass of carbon dioxide over a 100-year time period. As examples, 1,1,1,2-tetrafluoroethane (HFC-134a) has a 100 year time horizon GWP of 1320; 1,1,1,3,3-pentafluoropropane (HFC-245fa) has a 100 year time horizon GWP of 900-1030; trans-1,3,3,3-tetrafluoropropene (HFO-1234ze) has a 100 year time horizon GWP of 6; trans-1-chloro-3,3,3-trifluoropropene (HFO-1233zd) has a 100 year time horizon G-WP of 1; and $CO_2$ has a 100 year time horizon GWP of 1, by definition (regardless of the time horizon). Herein a compound has a "low global warming potential" if the 100 year time horizon GWP is 100 or less. Preferably, the 100 year time horizon GWP is 10 or less, and more preferably, it is 1.

The problem addressed herein is the poor shelf life stability of the polyurethane or polyisocyanurate foam formulations when using HHO (including HFO) blowing agents. Halide ion, $X^-$, is the byproduct of the unwanted side reaction between catalysts and HHO blowing agents during storage (and fluoride ion, $F^-$, is the byproduct of the unwanted side reaction between catalysts and HFO blowing agents during storage). The amount of halide ion (fluoride ion) generated is evaluated using an accelerated aging study with heating at 50° C. (Aging at 50° C. for 1 week is approximately equivalent to aging at room temperature (25° C.) for 1-3 months).

Herein, a two-component polyurethane or polyisocyanurate spray foam composition is considered to be "storage-stable" if both the A-side component and the B-side component, separately, generate less than 300 ppm of halide ion (fluoride ion) after one week of aging at 50° C.; or, in some embodiments, less than 200 ppm, or less than 100 ppm, of halide ion (fluoride ion) after one week of aging at 50° C.

Generally, suitable polyisocyanates for the synthesis of polyurethanes include aliphatic, cycloaliphatic, arylaliphatic and aromatic polyisocyanates. The polyisocyanates may be polymeric, monomeric or a blend of monomeric and polymeric isocyanates. Examples of suitable polyisocyanates include alkylene diisocyanates having from 4 to 12 carbon atoms in the alkylene moiety (such as, for example, 1,12-dodecane diisocyanate; 2-methylpentamethylene 1,5-diisocyanate; tetramethylene 1,4-diisocyanate; and hexamethylene 1,6-diisocyanate (HDI)), cycloaliphatic diisocyanates (such as, for example, cyclohexane 1,3- and 1,4-diisocyanate (CHDI); 5-isocyanato-1-(isocyanatomethyl)-1,3,3-trimethyl-cyclohexane (also known as isophorone diisocyanate, or IPDI); 2,4- and 2,6-hexahydrotoluene diisocyanate and the corresponding isomer mixtures; 4,4'-, 2,2'- and 2,4'-dicyclohexylmethane diisocyanate (H12MDI) and the corresponding isomer mixtures) as well as aromatic diisocyanates and polyisocyanates (such as, for example, 2,4- and 2,6-toluene diisocyanate and the corresponding isomer mixtures thereof; 4,4'-, 2,4'- and 2,2'-diphenylmethane diisocyanates and the corresponding isomer mixtures thereof; and polymethylene polyphenyl isocyanates (polymeric MDI or p(MDI) herein)). In some embodiments of the invention, the polyurethane or polyisocyanurate foam is formed from one or more polyisocyanates which may comprise or consist of polymeric polyisocyanate compounds, such as p(MDI). In some embodiments, the composition can comprise p(MDI) having an equivalent weight in the range of from 100 to 10000, desirably from 100 to 5000, or from 100 to 2500. In some embodiments of the invention, the polyurethane polymer is formed from one or more aliphatic or cycloaliphatic polyisocyanate compounds. In some embodiments, the one or more aliphatic or cycloaliphatic polyisocyanate comprises isophorone diisocyanate. In some embodiments, the one or more aliphatic or cycloaliphatic polyisocyanate is isophorone diisocyanate. In some embodiments, the polyurethane or polyisocyanurate spray foam of the present invention is free of toluene diisocyanate and reaction products of toluene diisocyanate in order to avoid concern with possible health issues associated with toluene diisocyanate. In some embodiments, the polyurethane or polyisocyanurate spray foam of the present invention is substantially free of monomeric aromatic polyisocyanate and reaction products of monomeric aromatic polyisocyanate in order to avoid concern with possible health issues associated with monomeric aromatic polyisocyanate. Commercially available polyisocyanates include, but are not limited to, Lupranate® M20S (BASF Corp., Ludwigshafen, Germany), Mondur® MR (Covestro, Leverkusen, Germany), and PAPI™ 27 (Dow Chemical Co., Midland, Mich., USA).

The polyol component is generally one or more than one polymeric polyol and is characterized by having an average hydroxyl functionality of 2.0 or more, and typically in a range of 2.0 to 7.0. The average hydroxyl functionality for a polymeric polyol component can be measured according to ASTM D4274-11 (method D). The hydroxyl functionality of the polyols in the polymeric polyol component can be any value but should be selected such that the average hydroxyl functionality of the entire polymeric polyol component is in a desired range, for example, but not limited to, from 2.0 to 7.0.

Suitable polymeric polyol components for polyurethane synthesis include polyether polyols, polyester polyols, and polycarbonate polyols, as well as polycaprolactone polyols, polyacrylate polyols, polybutadiene polyols, and polysulfide polyols. These can be used individually or in any desired mixtures with one another. Polyisocyanurate foams generally use polyester polyols.

Polyether polyols include those obtainable using conventional synthesis means by reacting epoxides (alkylene oxides such as those selected from a group consisting of ethylene oxide, propylene oxide and butylene oxide, or combinations thereof) with an initiator having two active hydrogen atoms (for a diol) or with an initiator having three active hydrogen atoms (for a triol) or initiators having more than three active hydrogen atoms (for polyols with more than three hydroxyl functional groups). Examples of suitable initiators include ethylene glycol, diethylene glycol, propylene glycol, dipropylene glycol, tripropylene glycol, 1,4-butanediol, 1,6-hexane diol; cycloaliphatic diols such as 1,4-cylcohexane diol, glycerol, trimethylol propane, ethylenediamine, triethanolamine, sucrose and aromatic based initiators or mixtures thereof. Desirable polyols are those obtainable using ethylene oxide, or propylene oxide, or a combination of ethylene oxide and propylene oxide (i.e. poly(ethylene oxide-propylene oxide)). Another commonly used polyether polyol is polytetramethylene glycol polyol. Polyether polyols are commercially available, for example, but are not limited to, Voranol™ 360, Voranol™ 370 or Voranol™ RN482 (The Dow Chemical Co., Midland, Mich., USA); or JEFFOL® SG-360 or JEFFOL® SG-522 (Huntsman Corp., The Woodlands, Tex., USA); or Carpol® SP-477, Carpol® GSP-280 or Carpol® GSP-355 (Carpenter Co., Richmond, Va., USA).

Polyester polyols include those obtainable from conventional synthesis means using polycarboxylic acids and polyfunctional alcohols such as those having from 2 to 12 carbon atoms. Examples of suitable polycarboxylic acids include glutaric acid, succinic acid, adipic acid, sebacic acid, phthalic acid, isophthalic acid, and terapthtalic acid. Examples of suitable polyfunctional alcohols that can be combined with any of these polycarboxylic acids include ethylene glycol, propanediol (including propylene glycol), butanediol, hexanediol and neopentyl glycol. For example, poly(neopentyl glycol adipate) can be synthesized using neopentyl glycol and adipic acid. Polyester polyols are commercially available, for example, but are not limited to, Terol® 350 or Terol® 352 (Huntsman Corp., The Woodlands, Tex., USA); or STEPANPOL® PS-2352 or STEPANPOL® PS-2412 (Stepan Company, Northfield, Ill., USA); or Terate® 3512 or Terate® 3512A (INVISTA, Wichita, Kans., USA).

Polycarbonate polyols include those obtainable from the reaction of polyfunctional alcohols (for example, diols, including those disclosed above) with carbon acid derivatives, such as, for example, diphenyl carbonate, dimethyl carbonate, ethylene carbonate or phosgene. For example, polyhexamethylene carbonate can be synthesized by ester-exchanging polycondensation of ethylene carbonate (or dimethyl carbonate) and 1,6-hexanediol. Polycarbonate polyols are commercially available, for example, but are not limited to, DESMOPHEN® C. 2100 (Covestro AG, Leverkusen, Germany).

In some embodiments, the composition can comprise one or more polymeric polyether polyols, polyester polyols, polycarbonate polyols, or a combination thereof, having an equivalent weight (g/eq) in the range of from 30 to 10000, more preferably from 30 to 5000, and most preferably from 30 to 2500.

The quantities of isocyanate and polyol in the present invention are generally such as to give a formulation index of about 30 to 300 for the polyurethane foam formulation. In certain embodiments, the index of the polyurethane foam formulation (the ratio of the isocyanate —NCO groups to the polyol —OH groups, multiplied by 100) is 30, 35, 40, 45, 50, 55, 60, 65, 70, 75, 80, 85, 90, 95, 100, 105, 110, 115, 120, 125, 130, 135, 140, 145, 150, 155, 160, 170, 180, 190, 200, 210, 220, 230, 240, 250 or 300. Each of the foregoing numbers can be preceded by the word "about," "at least about," or "less than about," and any of the foregoing numbers can be used singly to describe an open-ended range or in combination to describe a closed-ended range. In an embodiment designed for rigid foams, the index for the polyurethane foam formulation is from 100 to 300, and is, desirably, from 100 to 250, or from 100 to 200. In another embodiment designed for flexible foams, the index for the foam formulation is from 30 to 100, and is, desirably, from 35 to 95, or from 40 to 80.

The index for a polyisocyanurate foam formulation is usually considerably higher, usually above 150, such as from about 150 to about 400. In certain embodiments, the index of the polyisocyanurate foam formulation (the ratio of the isocyanate —NCO groups to the polyol —OH groups times 100) is 150, 160, 170, 180, 190, 200, 210, 220, 230, 240, 250, 260, 270, 280, 290, 300, 310, 320, 330, 340, 350, 360, 370, 380, 390 or 400. Each of the foregoing numbers can be preceded by the word "about," "at least about," or "less than about," and any of the foregoing numbers can be used singly to describe an open-ended range or in combination to describe a closed-ended range. In an embodiment, the index for the polyisocyanurate foam formulation is from 180 to 400, and is, desirably, from 200 to 350, or from 250 to 350.

In order to facilitate production of a fine wet foam and optionally provide enhanced properties for specialized applications for the cured foam, the combined ingredients of the A-side and B-side components may be minimally formulated such that, upon spraying and combination of the two-pack components, a foamable pre-urethane or pre-isocyanurate composition is presented. For example, for dispensing from a pressurized container, the formulation may include one or more propellant, for example, liquefiable blowing gases (blowing agents) as known in the art. Blowing agents are often referred to in the art as gaseous blowing agents or liquid blowing agents according to the state of the blowing agent at ambient temperature and pressure (for example, at 25° C. and one atmosphere). In the current invention, with the proviso that minimally the B-side component comprises pressurized gaseous $CO_2$ and one or more liquid blowing agent, both the A-side component, and, separately, the B-side component, may comprise one or more gaseous blowing agent, or one or more liquid blowing agent, or both one or more gaseous blowing agent and one or more liquid blowing agent.

Desirably, on account of requiring a lower global warming potential, for both the A-side component and the B-side component, the primary blowing agent (and, preferably, also the co-blowing agent) is gaseous $CO_2$ and/or one or more hydrohaloolefin, although, optionally, other known blowing agents may function as co-blowing agents. Suitable hydrohaloolefins include fluoroalkenes or chlorofluoroalkenes containing from 3 to 4 carbon atoms and at least one C—C double bond.

Suitable gaseous hydrohaloolefin blowing agents in either the A-side component or in the B-side component, or both, include hydrofluoroolefins, for example, but not limited to, 3,3,3-trifluoropropene (HFO); 1,3,3,3-tetrafluoropropene (HFO 1234ze); 2,3,3,3-tetrafluoroprop-1-ene (HFO 1234yf); 1,2,3,3,3,-pentafluoropropene (HFO 1225ye); 1,1,1,3,3-pentafluoropropene (HFO 1225zc); 1,1,2,3,3-pentafluoropropene (HFO 1225yc); (Z)-1,1,1,2,3-pentafluoropropene (HFO 1225yez(Z)); or a combination thereof. Desirably, the gaseous hydrohaloolefin in either the A-side component or in the B-side component, or both, is or comprises 1,3,3,3-tetrafluoropropene (HFO 1234ze).

Suitable liquid hydrohaloolefin blowing agents in the A-side component or in the B-side component, or, optionally, in both the A-side component and in the B-side component, include hydrofluoroolefins, for example, but not limited to, (Z)-1,1,1,4,4,4-hexafluorobut-2-ene (HFO 1336mzzm(Z)); and hydrochlorofluoroolefins, such as, for example, (E)-1-chloro-3,3,3-trifluoropropene (HFO 1233zd (E)). HFO 1233zd is a preferred liquid HHO blowing agent.

The total blowing agent content may be from 1-40% by weight of the combined A-side and B-side component formulations, or more commonly 3-30%, or 3-25%, or 10-20% by weight of the total weight of the foamable pre-urethane or pre-isocyanurate ingredients. The weight % of the blowing agents in the A-side and B-side component may or may not be equal. For example, excluding water, the blowing agent content may be from 1-45% by weight of the B-side component formulation, or more commonly 5-40%, or 10-35% by weight of the B-side component formulation; and, excluding water, the blowing agent content may be from 0-30% by weight of the A-side component formulation, or more commonly 0-20%, or 5-20%, or 5-15% by weight of the A-side component formulation.

The amount of the one or more liquid blowing agent (LBA) in the B-side component formulation may be (wt. %): 1, 3, 5, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 42, 45, or 50. Each of the foregoing numbers can be preceded by the word "about," "at least about," or "less than about," and any of the foregoing numbers can be used singly to describe an open-ended range or in combination to describe a closed-ended range. In certain embodiments, the amount of LBA (for example, HFO 1233zd) in the B-side component formulation may be from 5 to 45 wt. %, or 10 to 40 wt. %, and is, desirably, from 10 to 35 wt. %, or from 10 to 30 wt. %.

In preferred embodiments, gaseous $CO_2$ is included in the B-side (polyol) component, but may, optionally, be present in both the A-side and B-side components. In certain embodiments, pressurized gaseous $CO_2$ may be present in the B-side component in an amount (wt. %) of: 0.2, 0.25, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.2, 4.4, 4.4, 4.6, 4.8, 5.0, 5.5, 6.0, 7.0, 8.0, 9.0, or 10.0. Each of the foregoing numbers can be preceded by the word "about," "at least about," or "less than about," and any of the foregoing numbers can be used singly to describe an open-ended range or in combination to describe a closed-ended range. In certain embodiments, the amount of pressurized gaseous $CO_2$ in the B-side component formulation may be from 0.2 to 10 wt. %, or from 0.25 to 10 wt. %, or from 0.5 to 10 wt.

%, or from 0.75 to 10 wt. %, or from 0.5 to 5 wt. %, and is, desirably, from 1.0 to 10 wt. %, or from 1.0 to 5.0 wt. %.

The pressurized gaseous $CO_2$ is present in the B-side component container and provides a pressure (in MPa, at 25° C.) on the B-side component formulation of: 0.07, 0.08, 0.10, 0.12, 0.14, 0.16, 0.18, 0.20, 0.22, 0.24, 0.26, 0.28, 0.30, 0.32, 0.34, 0.36, 0.38, 0.40, 0.45, 0.50, 0.55, 0.60, 0.65, 0.70, 0.75, 0.80, 0.85, 0.90, 0.95, 1.0, 1.1, 1.2, 1.3, 1.4, 1.5, 1.6, 1.7, 1.8, 1.9, 2.0, 2.5, 3.0, 3.5, or 4.0. Each of the foregoing numbers can be preceded by the word "about," "at least about," or "less than about," and any of the foregoing numbers can be used singly to describe an open-ended range or in combination to describe a closed-ended range. In certain embodiments, the pressurized gaseous $CO_2$ in the B-side component container provides a pressure (in MPa, at 25° C.) on the B-side component formulation of from 0.07 to 4.0 MPa, or from 0.08 to 4.0 MPa, or from 0.14 to 4.0 MPa, or from 0.20 to 4.0 MPa, and is, desirably, from 0.26 to 4.0 MPa, or from 0.26 to 3.0 MPa, or from 0.26 to 2.0 MPa.

Desirably, $CO_2$ and HHOs in combination make up at least 50%, or at least 75%, by weight of the total blowing agent content (combined A-side and B-side components); and, in some embodiments, at least 90% by weight of the total blowing agent content, or, in some embodiments, all of the blowing agents are $CO_2$ and HHOs. In some embodiments, $CO_2$ and HFOs in combination make up at least 50%, or at least 75%, by weight of the total blowing agent content (combined A-side and B-side components); and, in some embodiments, at least 90% by weight of the total blowing agent content, or, in some embodiments, all of the blowing agents are $CO_2$ and HFOs.

Optional co-blowing agents, as known in the art, are not particularly limited in type, and may include, for example, propane, butane, isobutane, pentane, hexane, dimethyl ether, diethyl ether, acetone, methyl ethyl ketone, and the like, as well as, or in the alternative, chlorofluorocarbons (CFC's) and/or hydrofluorocarbons (HFC's) such as, for example, trichlorofluoromethane (CFC-11), dichlorodifluoromethane (CFC-12), 1,1,2,2-tetrafluoroethane (HFC-134), 1,1,1,2-tetrafluoroethane (HFC-134a), and 1,1-difluoroethane (HFC-152a), 1,1,1,3,3-pentafluoropropane (HFC-245a) and the like, which may be used alone or in combination. Other supplemental gases, such as nitrogen, argon, etc. may also be used.

Optionally, water may be incorporated in these compositions, for example in an amount of from 0 to 10 wt. % of the total composition weight, which may react with the isocyanate to produce carbon dioxide. However, as noted above, $CO_2$ produced in this manner is insufficient to act as a blowing agent. As used herein, the terms "blowing agent" and "co-blowing agent" do not include water even though it may produce $CO_2$.

Conventionally, polyurethane and polyisocyanurate foams are produced using three types of catalyst, for example, one or more of: a blowing catalyst, a gelling catalyst and a trimerization catalyst. Conventional gelling catalysts include various metal complexes, such as, for example, tin carboxylates, bismuth carboxylates, zinc carboxylates, zirconium carboxylates, and nickel carboxylates. Examples include stannous octoate (tin(II) 2-ethylhexanoate), tin mercaptide and dibutyltin dilaurate (dialkyltin dicarboxylates generally). Conventional blowing catalysts include, most commonly, various tertiary amines, such as, for example, trimethylamine, triethylamine, dimethylethanolamine, N,N-Dimethylcyclohexylamine, N,N-Dicyclohexylmethylamine, 4,4'-(Oxydi-2,1-ethanediyl)bismorpholine (DMDEE), or 1,4-diazabicyclo[2.2.2]octane (DABCO). Conventional trimerization catalysts in the formulation with the NCO index higher than 200 include potassium carboxylate salts, such as, for example, potassium octanoate or potassium pivalate. Such catalysts are normally effective in an amount of from 0.25 wt. % to 3.0 wt. %, although higher or lower amounts may be used. Conventionally, for example, when using HFC and CFC blowing agents, the B-side component is the fully formulated component and includes the catalysts and all other additives, whereas the A-side component is simply the one or more isocyanate component(s), optionally with a blowing agent to aid in dispensing the isocyanate and mixing with the B-side formulation ingredients while dispensing the A-side component. The commonly used catalysts cannot be added in the A-side component because they either react with isocyanates or cause the isocyanate to react with itself, resulting in the container contents solidifying completely within a few days.

As alluded to above, HFC and CFC blowing agents will soon be regulated and will no longer be available for use in such two-component polyurethane or polyisocyanurate spray foam compositions. HFO blowing agents would appear to be a suitable replacement, at least from the standpoint of having a much lower global warming potential, except that the formulations are not storage stable and the foam produced from stored formulations is of an inferior and unsatisfactory quality. The present invention utilizes $CO_2$ as the GBA in the B-side component.

Other optional additives as known in the art include, but are not limited to, viscosity modifiers (thickeners), surfactants, flame retardants, anti-freeze agents, anti-corrosion agents, co-solvents, cell stabilizers, colorants, fillers, pigments, biocides, fungicides, algicides, etc. Such additives may make up 5-30% by weight of the total foamable pre-urethane or pre-isocyanurate ingredients.

In some embodiments, the total foamable A-side component and B-side component ingredients comprise up to 10%, such as, for example, 0.1 to 10%, by weight in relation to the entire foamable A-side component and B-side component ingredients, of ionic surfactants, soaps, or waxes. In some embodiments, the foamable A-side and B-side ingredients comprise less than 0.3%, by weight in relation to the entire foamable A-side and B-side ingredients, of ionic surfactants, soaps, or waxes. Such ionic surfactants, soaps, or waxes, when used, are normally added to the B-side component of the formulation. In some embodiments, the foamable A-side and B-side ingredients are free of ionic surfactants, soaps, or waxes.

Other surfactants as known in the art may also, or alternatively, be used, such as silicone surfactants. In some embodiments, the silicone surfactant is a polysiloxane-polyoxyalkylene block copolymer. Alternatively, or in addition, a non-silicone non-ionic surfactant may be used. Such surfactants may be added to either or both the A-side and B-side components of the formulation (in a total amount of from 0.25% to 5.0%, or 0.5% to 4.0%, desirably 0.7% to 3.0%, by weight of the total A-side and B-side component formulation weight). The level of silicone surfactant or non-silicone non-ionic surfactant in either the B-side component of the formulation, or in each of the A-side component and B-side component, may be in an amount of from 0.25 to 5.0%, or 0.5% to 4.0%, or desirably 0.7% to 3.0%, by weight of the B-side component formulation weight (or by weight of each of the A-side component and B-side component formulation weights).

Polyurethane and polyisocyanurate foams find utility in many building and construction applications, and so the fully formulated compositions may optionally (and often do) incorporate flame retardants (in a combined amount of from 0 to 30%, desirably 1.0% to 20%, by weight of the combined A-side and B-side component formulation weight). Suitable flame retardants, as known in the art, include (but are not limited to) alkylphosphates, haloalkylphosphates, alkylphosphonates, haloalkylphosphonates, or halogenated polyols, such as, for example, triethylphosphate, tris(chloropropyl)phosphate, tris(2-chloroethyl)phosphate, tris(2,3-dibromopropyl)phosphate, diethyl ethylphosphonate, diethyl (bromodifluoromethyl)-phosphonate, tetrabromophthalate diol and the like.

In certain embodiments, both the formulated A-side component and the formulated B-side component described herein, separately, can exhibit a fluoride ion concentration range of from 0 ppm to 300 ppm after heating at 50° C. for one week. The fluoride ion concentration (in ppm) of either or both of the A-side component and the B-side component after heating at 50° C. for one week may be 0, 0.1, 10, 20, 30, 40, 50, 60, 70, 80, 90, 100, 120, 140, 150, 160, 180, 200, 220, 240, 250, 260, 280, 300. Each of the foregoing numbers can be preceded by the word "about," "at least about," or "less than about," and any of the foregoing numbers can be used singly to describe an open-ended range or in combination to describe a closed-ended range. For example, in some embodiments, the fluoride ion concentration after heating at 50° C. for one week can be less than about 300 ppm, for example 0 ppm to 300 ppm or 0.1 ppm to 300 ppm, and desirably is less than 250 ppm, or less than 200 ppm, or less than 150 ppm. Desirably, the fluoride ion concentration after heating at 50° C. for one week is zero, or close to zero, such as, for example, less than 100 ppm, for example 0 ppm to 100 ppm or 0.1 ppm to 100 ppm; less than 50 ppm, for example 0 ppm to 50 ppm or 0.1 ppm to 50 ppm; or less than 30 ppm, for example 0 ppm to 30 ppm or 0.1 ppm to 30 ppm.

The formulation shelf-life instability has an effect on the characteristic polyurethane/polyisocyanurate reaction parameters. For spraying application, a short rise time, gel time and tack-free time are essential even after at least 6 months of shelf life. The acceptable range of reactivity change after aging at 50° C. for one week is less than 75% increase of rise time or gel time compared with a fresh sample of the same formulation. In an embodiment, combination of the A-side component and the B-side component results in a rise time and gel time that is changed by less than 50% when the components have been aged at 50° C. for one week compared to the rise time and gel time that results for the freshly prepared and combined components. Desirably, combination of the A-side component and the B-side component results in a rise time and gel time that is changed by less than 35% when the components have been aged at 50° C. for one week compared to the rise time and gel time that results for the freshly prepared and combined components.

Measurement of the open cell content of the foam is a good analytical tool for evaluation of foam quality. The open cell content of the foam resulting from the sprayed two-component foam composition is preferably 25% or less, and, desirably, the open cell content may be 20% or less.

In some embodiments, there is provided methods of providing a space filling layer or space filling volume adjacent to or on a surface, said method comprising, consisting of, or consisting essentially of applying to said surface a foamed sample, or pre-foamed sample that generates a foamed sample, of a mixture of the foamable A-side component and B-side component ingredients of the invention; and allowing the foamed sample of foamable ingredients to cure to yield a stable foam. For example, disclosed herein is a method of providing a space filling layer or space filling volume adjacent to or on a surface, the method comprising, consisting of, or consisting essentially of: (a) providing a foamable composition comprising (i) an A-side component comprising one or more polyisocyanate and one or more blowing agent, and (ii) a B-side component comprising one or more polyol and one or more blowing agent comprising pressurized gaseous carbon dioxide and one or more liquid blowing agent; wherein the A-side component is contained in an A-side component container and the B-side component is contained in a B-side component container; and further wherein both the A-side component and the B-side component, separately, generate less than 300 ppm of fluoride ion after one week of aging at 50° C.; (b) applying a foamed sample, or pre-foamed sample that generates a foamed sample, of the foamable composition to said surface; and (c) allowing the foamed sample of foamable composition to cure to a foam having a density of less than 48 kg/m$^3$. In some embodiments, the step of applying the foamed sample, or pre-foamed sample that generates a foamed sample, of the foamable composition is performed by dispensing the foamable composition from a pressurized container.

Preferably, to aid in the process of spraying the foamable composition, the ratio of A-side component (by weight) to B-side component (by weight), the ratio A/B, should be less than 1.5, such as from 0.66 to 1.5.

In some embodiments, there are provided foams produced from the foamable compositions of the invention. In some embodiments, the foam is dispensed from a pressurized container, and dried to form the foam. The properties of the foams can be tuned to some extent according to the desired use. For example, the foams may be flexible foams, rigid foams or semi-rigid foams, and can have a closed cell structure, an open cell structure or a mixture of open and closed cells. The dry flexible polyurethane foam may have a density of from about 4.8 to about 24.0 kg/m$^3$, and desirably from about 6.4 to about 16.0 kg/m$^3$, and the dry rigid polyurethane foam may have a density of from about 16.0 to about 48.0 kg/m$^3$, and desirably from about 20.0 to about 48.0 kg/m$^3$, or from about 24.0 to about 40.0 kg/m$^3$. The dry rigid polyisocyanurate foam may have a density of from about 16.0 to about 48.0 kg/m$^3$, and desirably from about 20.0 to about 48.0 kg/m$^3$, or from about 24.0 to about 40.0 kg/m$^3$. The foams may be used in multiple fields and applications, for example, and without limitation, packaging, building and construction materials, and many more. In building and construction, the foams may be used to fill space between two surfaces, or portions of two surfaces, to block air transmission through gaps in the building envelope, or to provide thermal insulation and/or acoustic insulation, or to prevent unwanted movement of the surfaces, or to prevent abrasive wear or rattling due to movement of the surfaces. In providing thermal insulation and to find use as an insulation foam (usually a rigid foam), the foam should be a predominantly closed cell foam (for example, an open cell content of 25% or less as discussed earlier) and have an R-value of 4.4 per inch of foam thickness or higher, or 4.5 or higher, such as 5.0 or higher or 5.5 or higher, and preferably 6.0 or higher or 6.5 per inch of foam thickness or higher. (R-value is the thermal resistance per unit area. The units of R-value reported herein are the imperial/US units: ft$^{2\cdot\circ}$ F.·hr/BTU; multiply by 0.1762 to give SI units in m$^2$·K/W). Flexible foams, on the other hand, also find use as caulks, sealants or gaskets.

Some embodiments disclosed herein are set forth in the following clauses, and any combination of these clauses (or portions thereof) may be made to define an embodiment. For example, if a composition described in an embodiment may vary according to an additional feature or claim element, it is to be understood that other compositions described in other embodiments may also vary according to that same additional feature or claim element. Furthermore, methods described herein that utilize a composition may also vary by way of such compositional variations.

Clause 1: A storage-stable two-component polyurethane or polyisocyanurate spray foam composition comprising: (a) an A-side component comprising one or more polyisocyanate and one or more blowing agent; and (b) a B-side component comprising one or more polyol and one or more blowing agent comprising pressurized gaseous carbon dioxide and one or more liquid blowing agent; wherein both the A-side component and the B-side component, separately, generate less than 300 ppm of fluoride ion after one week of aging at 50° C.

Clause 2: The storage-stable two-component polyurethane or polyisocyanurate spray foam composition of any one of clauses 1-35, wherein the pressurized gaseous carbon dioxide in the B-side component is present at a level of from 0.5 wt. % to 10 wt. % carbon dioxide, based on the total weight of the B-side component. In an embodiment, the pressurized gaseous carbon dioxide in the B-side component is present at a level of from 0.75 wt. % to 10 wt. % carbon dioxide, or from 1.0 wt. % to 10 wt. % carbon dioxide, based on the total weight of the B-side component.

Clause 3: A storage-stable two-component polyurethane or polyisocyanurate spray foam composition comprising: (a) an A-side component comprising one or more polyisocyanate and one or more blowing agent; and (b) a B-side component comprising one or more polyol and one or more blowing agent comprising pressurized gaseous carbon dioxide and one or more liquid blowing agent; wherein the A-side component is contained in an A-side component container and the B-side component is contained in a B-side component container; and further wherein both the A-side component and the B-side component, separately, generate less than 300 ppm of fluoride ion after one week of aging at 50° C.

Clause 4: The storage-stable two-component polyurethane or polyisocyanurate spray foam composition of any one of clauses 3-35, wherein the pressurized gaseous carbon dioxide in the B-side component container provides a pressure of from 0.14 MPa to 4.00 MPa (21 psig to 580 psig) on the B-side component as measured at ambient temperature. In an embodiment, the pressurized gaseous carbon dioxide in the B-side component container provides a pressure of from 0.20 MPa to 4.00 MPa (29 psig to 580 psig), or from 0.26 MPa to 4.00 MPa (38 psig to 580 psig) on the B-side component as measured at ambient temperature.

Clause 5: The storage-stable two-component polyurethane or polyisocyanurate spray foam composition of any one of clauses 1-35, wherein the liquid blowing agent in the B-side component is present at a level of from 10 wt. % to 40 wt. %, based on the total weight of the B-side component. In an embodiment, the liquid blowing agent in the B-side component is present at a level of from 10 wt. % to 35 wt. %, or from 10.0 wt. % to 30 wt. %, based on the total weight of the B-side component.

Clause 6: The storage-stable two-component polyurethane or polyisocyanurate spray foam composition of any one of clauses 1-35, wherein the liquid blowing agent in the B-side component is or comprises a hydrohaloolefin. In one such embodiment, the A-side component comprises a gaseous blowing agent. In one such embodiment, the gaseous blowing agent in the A-side component is or comprises a hydrohaloolefin. In one such embodiment, the gaseous blowing agent in the A-side component is or comprises 1,3,3,3-tetrafluoropropene (HFO 1234ze), and the liquid blowing agent in the B-side component is or comprises (E)-1-chloro-3,3,3-trifluoropropene (HFO 1233zd).

Clause 6A: The storage-stable two-component polyurethane or polyisocyanurate spray foam composition of any one of clauses 1-35, wherein the blowing agent in the A-side component is or comprises a hydrohaloolefin gaseous blowing agent.

Clause 7: The storage-stable two-component polyurethane or polyisocyanurate spray foam composition of any one of clauses 1-35, wherein the liquid blowing agent in the B-side component is or comprises a hydrofluoroolefin, hydrochloroolefin or a hydrofluorochloroolefin.

Clause 8: The storage-stable two-component polyurethane or polyisocyanurate spray foam composition of any one of clauses 1-35, wherein one or more liquid blowing agent in the B-side component is selected from (Z)-1,1,1,4,4,4-hexafluorobut-2-ene (HFO 1336mzzm); or (E)-1-chloro-3,3,3-trifluoropropene (HFO 1233zd); or a combination thereof.

Clause 9: The storage-stable two-component polyurethane or polyisocyanurate spray foam composition of any one of clauses 1-35, wherein the liquid blowing agent in the B-side component is or comprises (E)-1-chloro-3,3,3-trifluoropropene (HFO-1233zd).

Clause 10: The storage-stable two-component polyurethane or polyisocyanurate spray foam composition of any one of clauses 1-35, wherein both the one or more blowing agent in the A-side component and the one or more blowing agent in the B-side component comprise a hydrohaloolefin (HHO) blowing agent.

Clause 11: The storage-stable two-component polyurethane or polyisocyanurate spray foam composition of any one of clauses 1-35, wherein both the one or more blowing agent in the A-side component and the one or more blowing agent in the B-side component comprise a hydrofluoroolefin (HFO) blowing agent.

Clause 12: The storage-stable two-component polyurethane or polyisocyanurate spray foam composition of any one of clauses 1-35, wherein both the one or more blowing agent in the A-side component and the one or more blowing agent in the B-side component comprise a hydrohaloolefin blowing agent, each one separately selected from 3,3,3-trifluoropropene (HFO); 1,3,3,3-tetrafluoropropene (HFO 1234ze); 2,3,3,3-tetrafluoroprop-1-ene (HFO 1234yf); 1,2,3,3,3,-pentafluoropropene (HFO 1225ye); 1,1,1,3,3-pentafluoropropene (HFO 1225zc); 1,1,2,3,3-pentafluoropropene (HFO 1225yc); (Z)-1,1,1,2,3-pentafluoropropene (HFO 1225yez); (Z)-1,1,1,4,4,4-hexafluorobut-2-ene (HFO 1336mzzm); or (E)-1-chloro-3,3,3-trifluoropropene (HFO 1233zd); or a combination thereof.

Clause 13: The storage-stable two-component polyurethane or polyisocyanurate spray foam composition of any one of clauses 1-35, wherein both the one or more blowing agent in the A-side component and the one or more liquid blowing agent in the B-side component comprise a hydrohaloolefin (HHO) blowing agent.

Clause 14: The storage-stable two-component polyurethane or polyisocyanurate spray foam composition of any one of clauses 1-35, wherein both the one or more blowing agent in the A-side component and the one or more liquid blowing agent in the B-side component comprise a hydrofluoroolefin (HFO) blowing agent. In one such embodiment, the A-side component comprises a hydrofluoroolefin (HFO)

gaseous blowing agent and the B-side component comprises a hydrofluoroolefin (HFO) liquid blowing agent. In one such embodiment, the A-side component comprises 1,3,3,3-tetrafluoropropene (HFO 1234ze) and the B-side component comprises (E)-1-chloro-3,3,3-trifluoropropene (HFO-1233zd).

Clause 15: The storage-stable two-component polyurethane or polyisocyanurate spray foam composition of any one of clauses 1-35, wherein both the A-side component and the B-side component comprise one or more liquid blowing agent.

Clause 16: The storage-stable two-component polyurethane or polyisocyanurate spray foam composition of any one of clauses 1-35, wherein both the one or more blowing agent in the A-side component and the one or more liquid blowing agent in the B-side component comprise a hydrohaloolefin blowing agent selected from (Z)-1,1,1,4,4,4-hexafluorobut-2-ene (HFO 1336mzzm); or (E)-1-chloro-3,3,3-trifluoropropene (HFO 1233zd); or a combination thereof.

Clause 17: The storage-stable two-component polyurethane or polyisocyanurate spray foam composition of any one of clauses 1-35, wherein both the one or more blowing agent in the A-side component and the one or more liquid blowing agent in the B-side component comprise (E)-1-chloro-3,3,3-trifluoropropene (HFO-1233zd).

Clause 18: The storage-stable two-component polyurethane or polyisocyanurate spray foam composition of any one of clauses 1-35, wherein both the A-side component and the B-side component comprise one or more blowing agent comprising pressurized gaseous carbon dioxide and one or more liquid blowing agent.

Clause 19: The storage-stable two-component polyurethane or polyisocyanurate spray foam composition of any one of clauses 1-35, wherein the polyisocyanate is or comprises MDI or p(MDI), or is or comprises an aliphatic or monocyclic cycloaliphatic polyisocyanate.

Clause 20: The storage-stable two-component polyurethane or polyisocyanurate spray foam composition of any one of clauses 1-35, wherein the polyol is or comprises a polyether polyol or a polyester polyol, or combination thereof.

Clause 21: The storage-stable two-component polyurethane or polyisocyanurate spray foam composition of any one of clauses 1-35, wherein the A-side component optionally further comprises a surfactant. In an embodiment, the surfactant is or comprises a silicone surfactant.

Clause 22: The storage-stable two-component polyurethane or polyisocyanurate spray foam composition of any one of clauses 1-35, wherein the B-side component optionally further comprises a surfactant. In an embodiment, the surfactant is or comprises a silicone surfactant.

Clause 23: The storage-stable two-component polyurethane or polyisocyanurate spray foam composition of any one of clauses 1-35, wherein the B-side component optionally further comprises one or more blowing catalyst. In an embodiment, the blowing catalyst is selected from dimethylethanolamine, N,N-Dimethylcyclohexylamine, N,N-Dicyclohexylmethylamine, 4,4'-(Oxydi-2,1-ethanediyl)bismorpholine (DMDEE), or 1,4-diazabicyclo[2.2.2]octane (DABCO), or combinations thereof.

Clause 24: The storage-stable two-component polyurethane or polyisocyanurate spray foam composition of any one of clauses 1-35, wherein the B-side component optionally further comprises one or more gelation catalyst. In an embodiment, the gelation catalyst is selected from tin carboxylates, bismuth carboxylates, zinc carboxylates, zirconium carboxylates, and nickel carboxylates, or combinations thereof.

Clause 24a: The storage-stable two-component polyurethane or polyisocyanurate spray foam composition of any one of clauses 1-35, wherein the B-side component optionally further comprises one or more trimerization catalyst. In an embodiment, the trimerization catalyst is selected from one or more potassium carboxylate salts.

Clause 25: The storage-stable two-component polyurethane or polyisocyanurate spray foam composition of any one of clauses 1-35, wherein the B-side component optionally further comprises one or more fire retardant. In an embodiment, the fire retardant is a halogenated compound or a phosphorus containing compound.

Clause 26: The storage-stable two-component polyurethane or polyisocyanurate spray foam composition of any one of clauses 1-35, wherein both the A-side component and the B-side component, separately, generate less than 250 ppm of fluoride ion after one week of aging at 50° C., or generate less than 200 ppm, or less than 100 ppm, or less than 50 ppm of fluoride ion after one week of aging at 50° C.

Clause 27: A storage-stable two-component polyurethane or polyisocyanurate spray foam composition comprising:
(a) an A-side component comprising:
(i) one or more polyisocyanate, (ii) one or more blowing agent; and (iii) optionally, one or more surfactant; and
(b) a B-side component comprising:
(i) one or more polyol, (ii) one or more blowing catalyst or gelation catalyst or combination thereof,
(iii) one or more blowing agent comprising pressurized gaseous carbon dioxide and one or more liquid blowing agent, (iv) optionally, one or more flame retardant; and (v) optionally, one or more surfactant.
In an embodiment, both the A-side component and the B-side component, separately, generate less than 300 ppm of fluoride ion after one week of aging at 50° C.; or less than 250 ppm of fluoride ion; or less than 200 ppm of fluoride ion; or less than 100 ppm of fluoride ion; or less than 50 ppm of fluoride ion after one week of aging at 50° C.

Clause 28: The storage-stable two-component polyurethane or polyisocyanurate spray foam composition of any one of clauses 27-35, wherein the pressurized gaseous carbon dioxide in the B-side component is present at a level of from 0.5 wt. % to 10 wt. % carbon dioxide, based on the total weight of the B-side component. In an embodiment, the pressurized gaseous carbon dioxide in the B-side component is present at a level of from 0.75 wt. % to 10 wt. % carbon dioxide, or from 1.0 wt. % to 10 wt. % carbon dioxide, based on the total weight of the B-side component.

Clause 29: A storage-stable two-component polyurethane or polyisocyanurate spray foam composition comprising:
(a) an A-side component comprising:
(i) one or more polyisocyanate, (ii) one or more blowing agent; and (iii) optionally, one or more surfactant; and
(b) a B-side component comprising:
(i) one or more polyol, (ii) one or more blowing catalyst, (iii) one or more gelation catalyst, (iv) one or more blowing agent comprising pressurized gaseous carbon dioxide and one or more liquid blowing agent, (v) optionally, one or more flame retardant; and (vi) optionally, one or more surfactant;
wherein the A-side component is contained in an A-side component container and the B-side component is contained in a B-side component container. In an embodiment, both the A-side component and the B-side component, separately, generate less than 300 ppm of fluoride ion after one week of aging at 50° C.; or less than 250 ppm of fluoride ion; or less than 200 ppm of fluoride ion; or less than 100 ppm of fluoride ion; or less than 50 ppm of fluoride ion after one week of aging at 50° C.

Clause 30: The storage-stable two-component polyurethane or polyisocyanurate spray foam composition of any one of clauses 29-35, wherein the pressurized gaseous carbon dioxide in the B-side component container provides a pressure of from 0.14 MPa to 4.00 MPa (21 psig to 580 psig) on the B-side component as measured at ambient temperature. In an embodiment, the pressurized gaseous carbon dioxide in the B-side component container provides a pressure of from 0.20 MPa to 4.00 MPa (29 psig to 580 psig), or from 0.26 MPa to 4.00 MPa (38 psig to 580 psig) on the B-side component as measured at ambient temperature.

Clause 31: The storage-stable two-component polyurethane or polyisocyanurate spray foam composition of any one of clauses 27-35, wherein the liquid blowing agent in the B-side component is or comprises (E)-1-chloro-3,3,3-trifluoropropene (HFO-1233zd).

Clause 32: The storage-stable two-component polyurethane or polyisocyanurate spray foam composition of any one of clauses 27-35, wherein the one or more blowing catalyst in the B-side component is or comprises an amine.

Clause 33: The storage-stable two-component polyurethane or polyisocyanurate spray foam composition of any one of clauses 27-35, wherein the one or more blowing catalyst in the B-side component is or comprises an N-heterocyclic compound or an N,X-heterocyclic compound.

Clause 34: The storage-stable two-component polyurethane or polyisocyanurate spray foam composition of any one of clauses 27-35, wherein the one or more blowing catalyst is or comprises a morpholino compound.

Clause 35: The storage-stable two-component polyurethane or polyisocyanurate spray foam composition of clause 34, wherein the morpholino compound is 4-(2-hydroxyethyl)morpholine, dimorpholinodiethyl ether, 4-(2-chloroethyl)morpholine, 4-ethylmorpholine, 4-methylmorpholine or 4-(2-aminoethyl)morpholine, or a combination thereof.

Clause 36: A method of providing a space filling layer or space filling volume adjacent to or on a surface, the method comprising:
(a) providing a foamable composition comprising:
(i) an A-side component comprising one or more polyisocyanate and one or more blowing agent; and (ii) a B-side component comprising one or more polyol and one or more blowing agent comprising pressurized gaseous carbon dioxide and one or more liquid blowing agent; wherein both the A-side component and the B-side component, separately, generate less than 300 ppm of fluoride ion after one week of aging at 50° C.;
(b) applying a foamed sample, or pre-foamed sample that generates a foamed sample, of the foamable composition to said surface; and
(c) allowing the foamed sample of foamable composition to cure to a foam having a density of less than 48 kg/m³.

Clause 37: The method of any one of clauses 36-51, wherein the pressurized gaseous carbon dioxide in the B-side component is present at a level of from 0.5 wt. % to 10 wt. % carbon dioxide, based on the total weight of the B-side component. In an embodiment, the pressurized gaseous carbon dioxide in the B-side component is present at a level of from 0.75 wt. % to 10 wt. % carbon dioxide, or from 1.0 wt. % to 10 wt. % carbon dioxide, based on the total weight of the B-side component.

Clause 38: A method of providing a space filling layer or space filling volume adjacent to or on a surface, the method comprising:
(a) providing a foamable composition comprising:
(i) an A-side component comprising one or more polyisocyanate and one or more blowing agent; and (ii) a B-side component comprising one or more polyol and one or more blowing agent comprising pressurized gaseous carbon dioxide and one or more liquid blowing agent; wherein the A-side component is contained in an A-side component container and the B-side component is contained in a B-side component container; and wherein both the A-side component and the B-side component, separately, generate less than 300 ppm of fluoride ion after one week of aging at 50° C.;
(b) applying a foamed sample, or pre-foamed sample that generates a foamed sample, of the foamable composition to said surface; and
(c) allowing the foamed sample of foamable composition to cure to a foam having a density of less than 48 kg/m³.

Clause 39: The method of any one of clauses 38-51, wherein the pressurized gaseous carbon dioxide in the B-side component container provides a pressure of from 0.14 MPa to 4.00 MPa (21 psig to 580 psig) on the B-side component as measured at ambient temperature. In an embodiment, the pressurized gaseous carbon dioxide in the B-side component container provides a pressure of from 0.20 MPa to 4.00 MPa (29 psig to 580 psig), or from 0.26 MPa to 4.00 MPa (38 psig to 580 psig) on the B-side component as measured at ambient temperature.

Clause 40: The method of any one of clauses 36-51, wherein the liquid blowing agent in the B-side component is present at a level of from 10 wt. % to 40 wt. %, based on the total weight of the B-side component. In an embodiment, the liquid blowing agent in the B-side component is present at a level of from 10 wt. % to 35 wt. %, or from 10.0 wt. % to 30 wt. %, based on the total weight of the B-side component.

Clause 41: The method of any one of clauses 36-51, wherein the liquid blowing agent in the B-side component is or comprises a hydrohaloolefin.

Clause 42: The method of any one of clauses 36-51, wherein the liquid blowing agent in the B-side component is or comprises (E)-1-chloro-3,3,3-trifluoropropene (HFO-1233zd).

Clause 43: The method of any one of clauses 36-51, wherein the step of applying the foamed sample is performed by spraying the foamable composition from a pressurized container.

Clause 44: The method of any one of clauses 36-51, wherein the B-side component further comprises one or more blowing catalyst.

Clause 45: The method of any one of clauses 44-51, wherein the one or more blowing catalyst in the B-side component is or comprises an N-heterocyclic compound or an N,X-heterocyclic compound.

Clause 46: The method of any one of clauses 44-51 wherein the one or more blowing catalyst in the B-side component is or comprises a morpholino compound.

Clause 47: The method of clause 46 wherein the morpholino compound is 4-(2-hydroxyethyl)-morpholine, dimorpholinodiethyl ether, 4-(2-chloroethyl)morpholine, 4-ethylmorpholine, 4-methylmorpholine or 4-(2-aminoethyl)morpholine, or a combination thereof.

Clause 48: The method of any one of clauses 36-51 wherein both the A-side component and the B-side component, separately, generate less than 250 ppm, or less than 200 ppm, or less than 100 ppm, or less than 50 ppm, of fluoride ion after one week of aging at 50° C.

Clause 49: The method of any one of clauses 36-51 wherein the foam has an R-value of 4.4 or higher; in an embodiment the foam has an R-value of 4.5 or higher.

Clause 50: The method of any one of clauses 36-51 wherein the foam has an open cell content of less than 25%; in an embodiment the foam has an open cell content of less than 20%.

Clause 51: The method of any one of clauses 36-50 wherein the foam has a density of 48 kg/m$^3$ or less; in an embodiment the foam has a density of 40 kg/m$^3$ or less.

Herein, any embodiment, clause or claim that includes the use of the wording "comprises" (or "comprising"), "consists of" (or "consisting of") or "consists essentially of" (or "consisting essentially of"), or similar expressions, includes embodiments, clauses or claims for which any of these alternatives exist.

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

EXAMPLES

Because of the formation of fluoride ions after side reactions between the catalyst and HFO, fluoride ion measurements can be a useful approach for assessing the shelf life of formulations comprising HFO. To evaluate the shelf life, the sample formulation was heated at 50° C. for 1 week as an accelerating condition. The heating at 50° C. for 1 week is approximately equivalent to the aging at room temperature for 1 to 3 months. Before the measurement of fluoride ion, the volatiles (blowing agents) were removed from samples by agitating the mixtures in an open vessel until effervescence ceased.

For measuring fluoride ion concentration of B-side samples, 1.0 mL of the B-side sample was added to a 20 mL glass scintillation vial and 9.0 mL of DI water was added using a 10 mL pipette. The mixture was vigorously shaken to bring all the contents up into the aqueous phase. The built pressure was released by unscrewing the cap. The sample was left in an open container for 24 hrs.

As a pre-treatment, before measuring fluoride ion concentration of A-side samples, 0.15 g of the A-side component was weighed out into a tared, clean, 20 mL glass vial and combined with 1 gram of acetone/MeOH (80/20 weight ratio). Using a 10 mL pipette, 9.0 mL of DI water was added to 1 mL of the A-side sample mixture to make a 1:10 dilution. The mixture was vigorously shaken to bring all the contents up into the aqueous phase. The built pressure was released by unscrewing the cap.

The 10 vol. % aqueous solution of the experimental material was allowed to rest undisturbed for 5 min to allow any water-insoluble material to separate. If necessary, the aqueous layer was decanted by pipet to a clean vial to avoid contamination of the equipment by insoluble material.

For determination of free flouride ion in experimental samples, 1.0 mL of the dilute aqueous solution prepared as described above was diluted with 1.0 mL TISAB II buffer (with or without 1,2-cyclohexanedinitrilotetraacetic acid—CDTA, Fisher Scientific). Fluoride ion concentration was quantified in the experimental solutions using a benchtop meter (Orion Versa Star Pro or Orion Dual Star, Thermo Scientific) equipped with a fluoride ion selective electrode (Orion model 9609BNWP, Thermo Scientific) according to the instrument instructions. To extrapolate the concentration of fluoride ion in the experimental samples before dilution, the measured fluoride ion concentration was multiplied by the dilution factor of the dilute aqueous sample relative to the experimental sample (in this case, 66.7). Before use, the meter was calibrated using fluoride ion standards with fluoride ion from 10-10,000 ppm that had been diluted with equal parts TISAB II buffer according to instrument instructions. Therefore, the dilution of the sample with TISAB II buffer is not taken into account when calculating the fluoride levels in experimental samples. Further, within the calibration range of the instrument of 10-10,000 ppm, instrument precision is considered to be ±1%.

For calculating the actual free fluoride ion concentration from the experimental sample, the measured value was multiplied by the dilution factor (X 10 for the B-side sample and X 66.7 for the A-side sample).

Key to Abbreviations used in the Examples:
GBA—gaseous blowing agent.
LBA—liquid blowing agent.
$CO_2$ is carbon dioxide.
HFC-134a is 1,1,1,2-tetrafluoroethane
HFC-245fa is 1,1,1,3,3-pentafluoropropane
HFO-1234ze is 1,3,3,3-tetrafluoropropene
HFO-1233zd is (E)-1-chloro-3,3,3-trifluoropropene
OPTEON® 1100 is (Z)-1,1,1,4,4,4-hexafluorobut-2-ene (HFO 1336mzzm(Z)), (OPTEON is a trademark of The Chemours Company, Wilmington, Del., USA).

Polyol 1—A 2.4 functional polyester polyol produced from purified terephthalic acid (37 wt %), glycerin (8 wt %), diethylene glycol (17 wt %), and 200 MW polyethylene glycol (38 wt %), hydroxyl number=350. (experimental polyol).

Polyol 2—A 6.9 functional sucrose/glycerine initiated polyol having an OH number of 370 mg KOH/gm. For example, VORANOL™ 370 polyol (VORANOL is a trademark of The Dow Chemical Company, Midland, Mich., USA).

Polyol 3—A high functional polyether polyol, (3-[2,3,4,5,6-pentakis(3-hydroxy-propoxy)hexoxy]propan-1-ol). For example, VORANOL™ RN482 polyol (VORANOL is a trademark of The Dow Chemical Company, Midland, Mich., USA).

p(MDI)—Polymeric methylene diphenyl diisocyanate (PMDI) having an average molecular weight of approximately 340 grams per mole, a functionality of approximately 2.7, an isocyanate equivalent weight of approximately 134 g/eq, and —NCO content of approximately 31.4 wt %. For example, PAPI™ 27 (PAPI is a trademark of The Dow Chemical Company, Midland, Mich., USA).

TEP—Triethyl Phosphate (CAS Reg. Number 78-40-0).
TCPP—Tris(2-chloro-1-methylethyl)phosphate (TCPP), CAS Reg. No: 13674-84-5.
A-B Diol—a reactive flame retardant intermediate, tetrabromophthalate diol, CAS Reg. No: 77098-07-8. For example, PHT4-DIOL (PHT4-DIOL is a trademark of Lanxess AG, Cologne, Germany).

Example 1

This example assessed the potential of a direct drop-in replacement, substituting a lower global warming potential HFO blowing agent in place of the conventional high global warming potential HFC blowing agent in a commercial formulation. Typically, the HFC blowing agent and the blowing catalyst are introduced in the B-side component formulation (shown as the Control, Comparative Example 1A, in Table 1). The full formulation for Comparative Example 1A (CE1A) is shown in Table 2. The Comparative in Table 1 (Comparative Example 1B) used the same formulation, but substituted equal quantities of an HFO blowing agent in place of the HFC blowing agent in the A-side and B-side components (HFO-1234ze gaseous blowing agent replaced HFC-134a gaseous blowing agent; and HFO-1233zd liquid blowing agent replaced HFC-245fa liquid blowing agent; see formulation for CE1B in Table 6). Table 1 shows the effect on foam formulation reaction parameters of aging the A-side and B-side formulations prior to mixing and foam formation. In general, aging the A-side or B-side formulation component for 1 week at 50° C. is considered to be approximately equivalent to aging that formulation component for 1-3 months under ambient conditions (approx. 25° C.).

TABLE 1

Effect of Aging on Foams from HFC Formulations and Replacement HFO Formulations

| | Control-HFC Blowing Agent Comparative Example 1A | | | Comparative-HFO Blowing Agent Comparative Example 1B | | |
|---|---|---|---|---|---|---|
| | Fresh | 1 Week at 50° C. | 7 Weeks at 50° C. | Fresh | 1 Week at 50° C. | 4 Weeks at 50° C. |
| Gel Time (s) | 29 | 28 | 36 | 19 | 38 | 58 |
| Rise Time (s) | 44 | 44 | 58 | 38 | 66 | 80 |
| Tack-free Time (s) | 45 | 45 | 59 | 34 | 73 | 90 |

The pass Control formulation (Comp. Ex. 1A: HFC blowing agent) showed reasonable shelf-life stability and the foams were still of good quality if produced after the formulation had been aged for 7 weeks at 50° C. Unfortunately, the HFC blowing agents have a high GWP, and the straight drop-in replacement of lower GWP HFO in place of HFC in the same formulation failed to reproduce the same shelf-life stability (Comp. Ex. 1B). The formulation reactivity was much reduced after aging (4 weeks at 50° C.), as shown by considerably slower reaction parameters (rise time, gel time, and tack-free time), and the foams that resulted from the aged formulations were of unacceptable quality (they were unstable with respect to collapse or partial collapse, had a high open cell content, and suffered from discoloration/yellowing). Varying the HFO gaseous blowing agent did not resolve the problem.

Example 2

This Example illustrates the surprising benefit of using pressurized gaseous $CO_2$ in combination with a liquid HHO (e.g., HFO) blowing agent in the B-side component of a two-component polyurethane or polyisocyanurate low pressure spray foam composition.

Table 2 shows the formulation ingredients in the A-side component and the B-side component for Examples Ex.1-Ex.4 and Comparative Examples CE1A-CE6 (in parts by weight added). Both the A-side component and the B-side component formulation sum to 100 g (so parts by weight is equivalent to wt. %).

TABLE 2

A-Side and B-Side Component Ingredients (parts by weight)

| A-Side Function | A-Side Component | CE1A | CE2 | CE3 | CE4 | Ex. 1 | Ex. 2 | Ex. 3 | Ex. 4 | CE5 | CE6 |
|---|---|---|---|---|---|---|---|---|---|---|---|
| Isocyanate | p(MDI) | 90.5 | 90.5 | 90.5 | 90.5 | 90.5 | 90.5 | 91.8 | 91.8 | 97.4 | 90.5 |
| Surfactant | Polysiloxane | 0.8 | 0.8 | 0.8 | 0.8 | 0.8 | 0.8 | 0.8 | 0.8 | 0.8 | 0.8 |
| GBA | HFC-134a | 8.7 | | | | | 8.7 | | | | |
| | HFO-1234ze | | 8.7 | 8.7 | 8.7 | 8.7 | | | | | 8.7 |
| | $CO_2$ | | | | | | | 2.2 | 2.2 | 1.8 | |
| LBA | HFO-1233zd | | | | | | | 5.2 | 5.2 | | |
| Total | Total | 100 | 100 | 100 | 100 | 100 | 100 | 100 | 100 | 100 | 100 |
| B-Side Function | B-Side Component | CE1A | CE2 | CE3 | CE4 | Ex. 1 | Ex. 2 | Ex. 3 | Ex. 4 | CE5 | CE6 |
| Polyol | Polyol 1 | 17.6 | 17.6 | 16.5 | 17.6 | 19.7 | 19.8 | 19.7 | 19.8 | 24.8 | 24.8 |
| | Polyol 2 | 22.0 | | | | | | | | | |
| | Polyol 3 | | 22.0 | 20.7 | 22.0 | 24.6 | 24.7 | 24.6 | 24.7 | 31.0 | 31.0 |
| Surfactant | Polysiloxane | 1.1 | 1.1 | 1.1 | 1.1 | 1.2 | 1.2 | 1.2 | 1.2 | 1.6 | 1.6 |

TABLE 2-continued

| | A-Side and B-Side Component Ingredients (parts by weight) | | | | | | | | | | |
|---|---|---|---|---|---|---|---|---|---|---|---|
| Water | Water | 0.25 | 0.25 | 0.21 | 0.25 | 0.28 | | 0.28 | | | |
| Flame | TEP | 4.6 | 4.6 | 4.3 | 4.6 | 5.2 | 5.2 | 5.2 | 5.2 | 6.5 | 6.5 |
| Retardant | TCPP | 13.0 | 13.0 | 11.2 | 11.9 | 14.5 | 14.5 | 14.5 | 14.5 | 18.3 | 18.3 |
| | A-B Diol | 7.3 | 7.3 | 6.8 | 7.3 | 8.2 | 8.2 | 8.2 | 8.2 | 10.3 | 10.3 |
| Gel | Tin Catalyst | 0.5 | 0.5 | | | 0.5 | 0.5 | 0.5 | 0.5 | 0.7 | 0.7 |
| Catalyst | K$^+$ carboxylate | 3.4 | 3.4 | 4.1 | 2.0 | 3.8 | 3.8 | 3.8 | 3.8 | 4.8 | 4.8 |
| Blowing | Amine Cat. 1 | | | | 4.8 | | | | | | |
| Catalyst | Amine Cat. 2 | | | | 2.0 | | | | | | |
| | Amine Cat. 3 | | | | 1.0 | | | | | | |
| GBA | HFC-134a | 19.0 | | | | | | | | | |
| | HFO-1234ze | | 19.0 | 19.0 | 19.0 | | | | | | |
| | CO$_2$ | | | | | 2.1 | 2.1 | 2.1 | 2.1 | 2.1 | 2.1 |
| LBA | HFC-245fa | 11.3 | | | | | | | | | |
| | HFO-1233zd | | 11.3 | 11.3 | 11.3 | 20.0 | 20.0 | 20.0 | 20.0 | 0.0 | 0.0 |
| | Opteon ® 1100 | | | | | | | | | | |
| Total | Total | 100 | 100 | 100 | 100 | 100 | 100 | 100 | 100 | 100 | 100 |

Foams were prepared from the formulations as follows: Into an appropriately sized plastic container with lid, all of the B-side components (which can include, but are not limited to, polyols, surfactants, colorants, catalysts, flame retardants) were weighed according to the formulation. An appropriately sized aerosol can and valve was assembled and a tare weight obtained. Into the aerosol can, the B-side mixture and any volatile but liquid-state blowing agents (e.g., HFC-245fa, HFO-1233zd) were weighed according to the recipe (such that the can was approximately 75% full by volume). Then the valve was crimped to the can using a can crimper, and another tare weight was obtained. The prescribed gaseous blowing agent (e.g., HFC-134a, HFO-1234ze, CO$_2$) was then added volumetrically via a glass burette fitted with filling and transferring valves. The actual weight of blowing agent was recorded, and more blowing agent was added, if necessary, to reach target. The can was then shaken for 60 shakes before being pressurized with nitrogen or temporarily stored (not to exceed 24 hours for fresh analyses, or longer periods for aged or accelerated age studies). The A-side component was prepared similarly in a separate can using the A-side formulation. The cans were then pressurized with nitrogen prior to testing. The cans were sprayed using the dispensing system designed for FROTH-PAK™ 12 Sealant Foam Insulation Kits (available commercially), and reaction parameters (rise time, gel time, tack-free time, etc.) and foam properties were measured.

Table 3 shows the properties of the resulting foams produced from the mixing of the A-side component and the B-side component formulations shown in Table 2, and the effect on foam formulation reaction parameters of aging the A-side and B-side formulations prior to mixing and foam formation.

TABLE 3

| Foam Properties and Effect of Aging A-Side and B-Side Formulations on Foam Properties | | | | | | | | | | |
|---|---|---|---|---|---|---|---|---|---|---|
| Foam Formation Property | CE1A | CE2 | CE3 | CE4 | Ex. 1 | Ex. 2 | Ex. 3 | Ex. 4 | CE5 | CE6 |
| GWP [1] Fresh Sample | 1300 | 6 | 6 | 6 | 6 | 398 | 6 | 6 | 6 | 5 |
| Ratio A/B | 1.0 | 0.95 | 0.91 | 0.94 | 1.0 | 1.2 | 0.99 | 1.0 | 2.9 | 2.5 |
| Gel Time (s) | 29 | 27 | 30 | 26 | 14 | 11 | 13 | 9 | 12 | 8 |
| Rise Time (s) | 44 | 41 | 49 | 40 | 30 | 26 | 32 | 30 | 25 | 24 |
| Tack-free Time (s) | 45 | 42 | 50 | 42 | 31 | 27 | 33 | 31 | 26 | 25 |
| Density (kg/m$^3$) | 28 | 26 | 26 | 29 | 27 | 29 | 28 | 28 | >60 | >60 |
| % Open Cell Content | 10 | N/M | N/M | N/M | 13 | 11 | 20 | 17 | No Foam | No Foam |
| R-Value [2] | 6.8 | 6.7 | 6.4 | N/M | 6.7 | 7.0 | 6.0 | 6.4 | No Foam | No Foam |
| Aged Sample (1 week at 50° C.) | | | | | | | | | | |
| Ratio A/B | 1.0 | 0.98 | 0.91 | 0.93 | 1.1 | 1.1 | N/M | 0.97 | N/M | N/M |
| Gel Time (s) | 28 | 38 | 34 | 21 | 18 | 11 | N/M | 13 | N/M | N/M |
| Rise Time (s) | 44 | 53 | 51 | 31 | 37 | 32 | N/M | 34 | N/M | N/M |
| Tack-free Time (s) | 45 | 54 | 52 | 32 | 38 | 33 | N/M | 23 | N/M | N/M |
| B-Side [F$^-$] (ppm) | 14 | 324 | 765 | 2765 | 13 | 12 | N/M | 14 | N/M | N/M |

N/M—not measured.
No Foam—no expansion (no foam was produced).
[1] GWP is the Global Warming Potential for the combined pre-reacted A-side component + B-side component.
[2] R-value is the thermal resistance per unit area (Units of R-value reported herein are the imperial/US units: ft$^2$ · °F · hr/BTU; multiply by 0.1762 to give SI units in m$^2$ · K/W).

In Table 3, above, Comparative Example CE1 shows a traditional formulation for a 2-component low pressure polyurethane spray foam formulation. Unfortunately, the HFC-134a gaseous blowing agent has a GWP of 1300 and will soon be regulated out of use due to concerns of its potential effects on the environment. The proposed replacement candidate for HFC-134a gaseous blowing agents is a hydrofluoroolefin (HFO), HFO-1234-ze (and, similarly, HFO-1233zd is a proposed replacement candidate for HFC-245fa liquid blowing agent). Comparative Examples CE2, CE3, and CE4 show attempts to update the formulation with a straight drop-in replacement of HFC-134a and HFC-245fa with the low GWP blowing agents, HFO-1234-ze (GBA) and HFO-1233zd (LBA).

When HFO blowing agents were used in the conventionally formulated B-side component (for example, CE1B in Table 1, and CE2 and CE3 in Table 2), the foam formation exhibited much slower reaction parameters (rise time, gel time, and tack-free time) after aging the formulation A-side and B-side components, and the foams that were produced after the formulation components had been aged for 4 weeks at 50° C. displayed unsatisfactory shelf-life: that is, the foams suffered from discoloration (yellowing) and partial foam collapse. Analysis of the B-side component formulation after aging showed highly elevated fluoride ion concentration in the HFO blowing agent formulations even after just 1 week of aging (324 ppm and 765 ppm in CE2 and CE3, respectively, compared to 14 ppm in the HFC-based control) resulting from side reactions of the amine blowing catalyst with the HFO. Similar side reactions did not occur with the HFC blowing agents, although the latter are being phased out due to their higher global warming potential. The release and increase in the fluoride ion content in the component formulations upon aging is a convenient way to measure relative shelf-life stability of various component formulations. Formulation A-Side and B-Side components having a fluoride ion content of less than about 300 ppm after 1 week at 50° C. have good shelf-life stability and can be considered as a commercial candidate.

Attempts to address the slower reaction times using higher levels and/or different catalysts resulted in much higher fluoride ion concentration (765 ppm and 2765 ppm in CE3 and CE4, respectively, compared to 14 ppm in the HFC-based control). On the other hand, when the gaseous HFO blowing agent in the B-Side component was replaced with pressurized gaseous carbon dioxide together with a liquid blowing agent (HFO-1233zd), Examples Ex.1-Ex.4, the reaction parameters were not significantly slowed after aging the formulation A-side and B-side components, and the foams that were produced after the formulation components had been aged for 1 week (and even 4 weeks) at 50° C. displayed a satisfactory shelf-life, and, surprisingly, produced good quality foams (less than 25% open cell content) with no discoloration and no foam collapse. The fluoride ion concentration in the A-side component formulation after 1 week at 50° C. was negligible and the fluoride ion concentration in the B-side component formulation was also very low (less than 25 ppm).

Comparative Examples CE5 and CE6 show attempts to produce foams using pressurized gaseous $CO_2$ as the blowing agent in the B-side component, but without any liquid blowing agent. These formulations failed to show any expansion and did not produce foams.

Table 4 shows the formulation ingredients in the A-side component and the B-side component for Examples Ex.5-Ex.9 and Comparative Examples CE7-CE9 (in parts by weight added).

TABLE 4

| A-Side and B-Side Component Ingredients (parts by weight) | | | | | | | | | |
|---|---|---|---|---|---|---|---|---|---|
| A-Side Function | A-Side Component | Ex. 5 | Ex. 6 | Ex. 7 | Ex. 8 | Ex. 9 | CE7 | CE-8 | CE9 |
| Isocyanate | p(MDI) | 97.4 | 90.5 | 90.5 | 90.5 | 90.5 | 90.5 | 91.8 | 90.5 |
| Surfactant | Polysiloxane | 0.8 | 0.8 | 0.8 | 0.8 | 0.8 | 0.8 | 0.8 | 0.8 |
| GBA | HFC-134a | | | | 8.7 | 8.7 | | | |
| | HFO-1234ze | | 8.7 | 8.7 | | | 8.7 | | |
| | $CO_2$ | 1.8 | | | | | | 2.2 | |
| LBA | HFO-1233zd | | | | | | | 5.2 | 8.7 |
| Total | Total | 100 | 100 | 100 | 100 | 100 | 100 | 100 | 100 |
| B-Side Function | B-Side Component | Ex. 5 | Ex. 6 | Ex. 7 | Ex. 8 | Ex. 9 | CE7 | CE-8 | CE9 |
| Polyol | Polyol 1 | 19.7 | 22.5 | 17.1 | 19.8 | 18.5 | 20.2 | 21.6 | 20.3 |
| | Polyol 2 | | | | | | | | |
| | Polyol 3 | 24.6 | 28.1 | 21.3 | 24.8 | 23.1 | 25.1 | 27.0 | 25.4 |
| Surfactant | Polysiloxane | 1.2 | 1.4 | 1.1 | 1.2 | 1.2 | 1.2 | 1.3 | 1.3 |
| Water | Water | 0.28 | | | 0.28 | 0.28 | 0.84 | 1.80 | |
| Flame | TEP | 5.2 | 5.9 | 4.5 | 5.2 | 4.8 | 5.2 | 5.6 | 5.3 |
| Retardant | TCPP | 14.5 | 16.5 | 12.6 | 14.5 | 13.6 | 14.8 | 15.9 | 14.9 |
| | A-B Diol | 8.2 | 9.3 | 7.1 | 8.2 | 7.7 | 8.4 | 9.0 | 8.4 |
| Gel | Tin Catalyst | 0.5 | 0.5 | 0.5 | 0.5 | 0.5 | 0.5 | 0.6 | 0.5 |
| Catalyst | $K^+$ carboxylate | 3.8 | 3.8 | 3.8 | 3.8 | 3.6 | 3.8 | 4.2 | 3.9 |
| Blowing | Amine Cat. 1 | | | | | | | | |
| Catalyst | Amine Cat. 2 | | | | | | | | |
| | Amine Cat. 3 | | | | | | | | |
| GBA | HFC-134a | | | | | | | | |
| | HFO-1234ze | | | | | | | | |
| | $CO_2$ | 2.1 | 2.1 | 2.1 | 2.1 | 2.1 | | | |
| LBA | HFC-245fa | | | | | | | | |
| | HFO-1233zd | 20.0 | 10.0 | 30.0 | | 24.6 | 20.0 | 13.0 | 20.0 |
| | Opteon ® 1100 | | | | 19.7 | | | | |
| Total | Total | 100 | 100 | 100 | 100 | 100 | 100 | 100 | 100 |

A-side and B-side formulations were prepared in the A-side container and B-side container and mixed as described above. Table 5 shows the properties of the resulting foams produced from the mixing of the A-side component and the B-side component formulations shown in Table 4, and the effect on foam formation reaction parameters of aging the A-side and B-side formulations prior to mixing and foam formation.

20, 25 and 30 wt. % of LBA (HFO-1233zd) in the B-side component, and also at the 20 wt. % level with an alternative LBA, Opteon® 1100. Although each of Comparative Examples CE7-CE9 had a suitable level of LBA (HFO-1233zd), all lacked $CO_2$ as a blowing agent in the B-side

TABLE 5

Foam Properties and Effect of Aging
A-Side and B-Side Formulations on Foam Properties

| Foam Formation Property | Ex. 5 | Ex. 6 | Ex. 7 | Ex. 8 | Ex. 9 | CE7 | CE-8 | CE9 |
|---|---|---|---|---|---|---|---|---|
| GWP [1] | 6 | 6 | 6 | 435 | 373 | 7 | 6 | 7 |
| *Fresh Sample* | | | | | | | | |
| Ratio A/B | 1.2 | 1.3 | 0.86 | 1.2 | 0.90 | 1.2 | 1.1 | 1.1 |
| Gel Time (s) | 9 | 10 | 15 | 13 | 20 | 18 | 12 | 9 |
| Rise Time (s) | 22 | 23 | 34 | 29 | 35 | 40 | 35 | 32 |
| Tack-free Time (s) | 23 | 24 | 35 | 30 | 36 | 41 | 36 | 35 |
| Density (kg/m³) | 30 | 44 | 24 | 30 | 23 | 25 | 27 | 29 |
| % Open Cell Content | 17 | 8 | 15 | 8 | 16 | 42 | 43 | 41 |
| R-Value [2] | 6.3 | 6.9 | 6.5 | 6.9 | XX | 4.5 | 4.5 | 4.2 |
| *Aged Sample (1 week at 50° C.)* | | | | | | | | |
| Ratio A/B | N/M | 1.6 | 1.1 | 1.5 | 0.9 | 1.0 | 1.8 | 1.0 |
| Gel Time (s) | N/M | 11 | 19 | 17 | 25 | 20 | 23 | 12 |
| Rise Time (s) | N/M | 29 | 36 | 33 | 45 | 42 | 44 | 36 |
| Tack-free Time (s) | N/M | 30 | 37 | 34 | 46 | 43 | 45 | 37 |
| B-Side [F⁻] (ppm) | N/M | 6 | 3 | 22 | 5 | 12 | 6 | 10 |

N/M—not measured.
[1] GWP is the Global Warming Potential for the combined pre-reacted A-side component + B-side component.
[2] R-value is the thermal resistance per unit area (Units of R-value reported herein are the imperial/US units: $ft^2 \cdot °F \cdot hr/BTU$; multiply by 0.1762 to give SI units in $m^2 \cdot K/W$).

In Table 5, above, Examples Ex.5-Ex.9 explore the effect of the liquid blowing agent (LBA) in the B-side component of the formulation: good foams were produced from each of these formulations while varying the LBA from levels of 10, component, and each of these failed to produce good foams, (all produced foams with an open cell content >40%).

Table 6 shows the formulation ingredients in the A-side component and the B-side component for Examples Ex.10-Ex.14 (in parts by weight added).

TABLE 6

A-Side and B-Side Component Ingredients (parts by weight)

| A-Side Function | A-Side Component | CE1B | CE10 | CE11 | Ex. 10 | Ex. 11 | CE12 | Ex. 12 | Ex. 13 |
|---|---|---|---|---|---|---|---|---|---|
| Isocyanate | p(MDI) | 90.5 | 92.2 | 92.2 | 92.2 | 92.2 | 92.2 | 92.2 | 91.8 |
| Surfactant | Polysiloxane | 0.8 | 0.8 | 0.8 | 0.8 | 0.8 | 0.8 | 0.8 | 0.8 |
| GBA | HFC-134a | | | | | | | | |
| | HFO-1234ze | 8.7 | | | | | | | |
| | CO₂ | | 1.8 | 1.8 | 1.8 | 1.8 | 1.8 | 1.8 | 2.2 |
| LBA | HFO-1233zd | | 5.2 | 5.2 | 5.2 | 5.2 | 5.2 | 5.2 | 5.2 |
| Total | Total | 100 | 100 | 100 | 100 | 100 | 100 | 100 | 100 |
| B-Side Function | B-Side Component | CE1B | CE10 | CE11 | Ex. 10 | Ex. 11 | CE12 | Ex. 12 | Ex. 13 |
| Polyol | Polyol 1 | 17.6 | 22.3 | 20.2 | 20.1 | 20.0 | 23.6 | 14.5 | 20.9 |
| | Polyol 2 | 22.0 | | | | | | | |
| | Polyol 3 | | 27.8 | 25.3 | 25.2 | 25.0 | 29.5 | 18.0 | 26.1 |
| Surfactant | Polysiloxane | 1.1 | 1.4 | 1.3 | 1.3 | 1.3 | 1.4 | 0.9 | 1.3 |
| Water | Water | 0.25 | | | | | | | 0.28 |
| Flame Retardant | TEP | 4.6 | 5.8 | 5.3 | 5.2 | 5.2 | 6.2 | 3.8 | 5.4 |
| | TCPP | 13.0 | 16.4 | 14.9 | 14.8 | 14.7 | 17.3 | 10.6 | 15.4 |
| | A-B Diol | 7.3 | 9.2 | 8.4 | 8.4 | 8.3 | 9.8 | 6.0 | 8.7 |
| Gel Catalyst | Tin Catalyst | 0.5 | 0.6 | 0.6 | 0.6 | 0.6 | 0.7 | 0.4 | 0.6 |
| Blowing | K⁺ carboxylate | 3.4 | 4.3 | 3.9 | 3.9 | 3.9 | 4.5 | 2.8 | 4.0 |
| | Amine Cat. 1 | | | | | | | | |

TABLE 6-continued

| A-Side and B-Side Component Ingredients (parts by weight) | | | | | | | | | |
|---|---|---|---|---|---|---|---|---|---|
| Catalyst | Amine Cat. 2 | | | | | | | | |
| | Amine Cat. 3 | | | | | | | | |
| GBA | HFC-134a | | | | | | | | |
| | HFO-1234ze | 19.0 | | | | | | | |
| | $CO_2$ | 0 | 0.2 | 0.2 | 0.5 | 1.0 | 2.0 | 3.0 | 4.4 |
| LBA | HFC-245fa | | | | | | | | |
| | HFO-1233zd | 11.3 | 12.0 | 20.0 | 20.0 | 20.0 | 5.0 | 40.0 | 13.0 |
| | Opteon ® 1100 | | | | | | | | |
| Total | Total | 100 | 100 | 100 | 100 | 100 | 100 | 100 | 100 |

Table 7 (below) shows the properties of the resulting foams produced from the mixing of the A-side component and the B-side component formulations shown in Table 6, and the effect on foam formation reaction parameters of aging the A-side and B-side formulations prior to mixing and foam formation.

TABLE 7

Foam Properties and Effect of Aging A-Side and B-Side Formulations on Foam Properties

| Foam Formation Property | CE1B | CE10 | CE11 | Ex. 10 | Ex. 11 | CE12 | Ex. 12 | Ex. 13 |
|---|---|---|---|---|---|---|---|---|
| GWP [1] | 6 | 7 | 7 | 6 | 6 | 5 | 6 | 5 |
| Fresh Sample | | | | | | | | |
| Ratio A/B | 1.2 | 1.7 | 1.1 | 0.9 | 1.1 | 2.0 | 1.0 | 1.1 |
| Gel Time (s) | 19 | 6 | 9 | 21 | 20 | 14 | 80 | 9 |
| Rise Time (s) | 38 | 34 | 31 | 42 | 41 | 28 | 93 | 16 |
| Tack-free Time (s) | 34 | 20 | 21 | 30 | 32 | 32 | 111 | 27 |
| Density (kg/m³) | 32 | 40 | 30 | 32 | 30 | 55 | 23 | 36 |
| % Open Cell Content | 7 | 14 | 30 | 22 | 17 | 10 | 24 | 17 |
| R-Value [2] | 6.8 | 5.5 | 4.7 | 4.6 | 5.6 | 5.9 | 5.0 | 6.0 |
| Aged Sample (1 week at 50° C.) | | | | | | | | |
| Ratio A/B | 1.3 | 1.7 | 1.1 | 1.4 | 1.3 | 1.4 | 1.2 | N/M* |
| Gel Time (s) | 38 | 12 | 10 | 23 | 26 | 20 | 84 | N/M* |
| Rise Time (s) | 66 | 35 | 37 | 49 | 55 | 39 | 159 | N/M* |
| Tack-free Time (s) | 73 | 30 | 33 | 39 | 46 | 40 | 138 | N/M* |
| B-Side [F⁻] (ppm) | 1210 | 2 | 5 | 2 | 2 | 1 | 1 | N/M* |

NM*—Not measured; aging studies at 50° C. considered unsafe at high pressure.
[1] GWP is the Global Warming Potential for the combined pre-reacted A-side component + B-side component.
[2] R-value is the thermal resistance per unit area (Units of R-value reported herein are the imperial/US units: ft² · °F. · hr/BTU; multiply by 0.1762 to give SI units in m² · K/W).

Table 7 illustrates the effect on foam formation and resulting foam properties when the level of gaseous $CO_2$ in the B-side component is varied. Samples Ex.10-Ex.14 showed that good foams can be produced at levels of $CO_2$ ranging from 0.5 wt. % to 4.4 wt. % $CO_2$ in the B-side component (although, due to safety concerns, the elevated temperature aging studies were not performed for the 4.4 wt. % $CO_2$ sample—sample Ex.14—on account of the higher pressure in the B-side component container). Sample CE-1B is the straight drop-in substitution of HFO blowing agents for the traditional HFC blowing agents, but without the use of $CO_2$ as a blowing agent, and this sample resulted in a similarly poor foam to those of samples CE2-CE4 due to side reactions that generate high levels of fluoride ion (1210 ppm after 1 week of aging at 50° C.). Samples CE10 and CE11 both employed low levels of $CO_2$ blowing agent, 0.2 wt. %, but were found to be sub-optimal: sample CE10 required a high A/B ratio to allow spraying; and sample CE11 produced a foam with a high open cell content (~30% open cell content).

Example 3

This Example shows the recorded $CO_2$ pressure in the B-side component container for various wt. % additions of $CO_2$, Table 8.

The $CO_2$ pressure measurements were run in a 1 L metal reactor with an overhead mixer and pressure gauge. All components of the B-side component formulation except for carbon dioxide were added to the reactor, which was approximately 75% full by volume. The reactor was sealed, and the mixer was turned on. Carbon dioxide was added to the reactor from a pressurized cylinder. The mass of carbon dioxide was measured with a mass flow meter. The reactor contents were mixed until the pressure in the reactor reached an equilibrium value, and the pressure was recorded.

TABLE 8

Measured Pressure for $CO_2$ Additions to the B-side Component Container

| $CO_2$ Added | Pressure (psig) | Pressure (MPa) |
|---|---|---|
| 0 | 5 | 0.03 |
| 0.30 | 14 | 0.10 |
| 0.56 | 22 | 0.15 |
| 0.97 | 36 | 0.25 |
| 1.70 | 61 | 0.42 |
| 2.36 | 84 | 0.58 |
| 3.47 | 123 | 0.85 |
| 4.44 | 157 | 1.08 |

A plot of the measured $CO_2$ pressure in the B-side component container (y axis) versus wt. % $CO_2$ added (x axis) gives a straight line graph with equation y=34.42x+3.35 with $R^2$ confidence factor of 0.999, from which one can obtain calculated pressures for a chosen wt. % addition of $CO_2$ (Table 9, below).

TABLE 9

Calculated Pressure for $CO_2$ Additions to the B-side Component Container

| $CO_2$ Added | Pressure (psig) | Pressure (MPa) |
|---|---|---|
| 0.20 | 10 | 0.07 |
| 0.25 | 12 | 0.08 |
| 0.50 | 21 | 0.14 |
| 1.0 | 38 | 0.26 |
| 1.5 | 55 | 0.38 |
| 2.0 | 72 | 0.50 |
| 2.5 | 89 | 0.62 |

TABLE 9-continued

Calculated Pressure for CO$_2$ Additions
to the B-side Component Container

| CO$_2$ Added | Pressure (psig) | Pressure (MPa) |
|---|---|---|
| 3.0 | 107 | 0.74 |
| 3.5 | 124 | 0.85 |
| 4.0 | 141 | 0.97 |

When ranges are used herein for physical properties, such as temperature ranges and pressure ranges, or chemical properties, such as chemical formulae, all combinations, and sub-combinations of ranges and specific embodiments therein are intended to be included.

The disclosures of each patent, patent application, and publication cited or described in this document are hereby incorporated herein by reference, in their entirety.

Those skilled in the art will appreciate that numerous changes and modifications may be made to the preferred embodiments of the invention and that such changes and modifications may be made without departing from the spirit of the invention. It is, therefore, intended that the appended claims cover all such equivalent variations as fall within the true spirit and scope of the invention.

What is claimed:

1. A storage-stable two-component polyurethane or polyisocyanurate spray foam composition comprising:
   a) an A-side component comprising one or more polyisocyanate and one or more blowing agent; and
   b) a B-side component comprising one or more polyol and one or more blowing agent comprising pressurized gaseous carbon dioxide and one or more liquid blowing agent;
wherein both the A-side component and the B-side component, separately, generate less than 300 ppm of fluoride ion after one week of aging at 50° C.

2. The storage-stable two-component polyurethane or polyisocyanurate spray foam composition of claim 1, wherein the pressurized gaseous carbon dioxide in the B-side component is present at a level of from 0.5 wt. % to 10 wt. % carbon dioxide, based on the total weight of the B-side component.

3. The storage-stable two-component polyurethane or polyisocyanurate spray foam composition of claim 1, wherein the pressurized gaseous carbon dioxide in the B-side component provides a pressure of from 0.14 MPa to 4.00 MPa (21 psig to 580 psig) on the B-side component as measured at ambient temperature.

4. The storage-stable two-component polyurethane or polyisocyanurate spray foam composition of claim 1, wherein the one or more liquid blowing agent in the B-side component is present at a level of from 10 wt. % to 40 wt. %, based on the total weight of the B-side component.

5. The storage-stable two-component polyurethane or polyisocyanurate spray foam composition of claim 1, wherein the one or more liquid blowing agent in the B-side component is or comprises a hydrohaloolefin.

6. The storage-stable two-component polyurethane or polyisocyanurate spray foam composition of claim 5, wherein the one or more blowing agent in the A-side component is or comprises a hydrohaloolefin gaseous blowing agent.

7. The storage-stable two-component polyurethane or polyisocyanurate spray foam composition of claim 1, wherein the one or more liquid blowing agent in the B-side component is or comprises a hydrofluoroolefin, hydrochloroolefin or a hydrofluorochloroolefin.

8. The storage-stable two-component polyurethane or polyisocyanurate spray foam composition of claim 1, wherein the one or more liquid blowing agent in the B-side component is or comprises (E)-1-chloro-3,3,3-trifluoropropene (HFO-1233zd).

9. The storage-stable two-component polyurethane or polyisocyanurate spray foam composition of claim 1, wherein both the one or more blowing agent in the A-side component and the one or more liquid blowing agent in the B-side component comprise a hydrohaloolefin blowing agent.

10. The storage-stable two-component polyurethane or polyisocyanurate spray foam composition of claim 1, wherein both the A-side component and the B-side component comprise one or more liquid blowing agent.

11. The storage-stable two-component polyurethane or polyisocyanurate spray foam composition of claim 1, wherein both the A-side component and the B-side component comprise one or more blowing agent comprising pressurized gaseous carbon dioxide and one or more liquid blowing agent.

12. A two-component polyurethane or polyisocyanurate spray foam composition comprising:
   a) an A-side component comprising:
      i) one or more polyisocyanate,
      ii) one or more blowing agent; and
      iii) optionally, one or more surfactant; and
   b) a B-side component comprising:
      i) one or more polyol,
      ii) one or more blowing catalyst or gelation catalyst or combination thereof,
      iii) one or more blowing agent comprising pressurized gaseous carbon dioxide and one or more liquid blowing agent,
      iv) optionally, one or more flame retardant; and
      v) optionally, one or more surfactant.

13. The two-component polyurethane or polyisocyanurate spray foam composition of claim 12, wherein the pressurized gaseous carbon dioxide in the B-side component is present at a level of from 0.5 wt. % to 10 wt. % carbon dioxide, based on the total weight of the B-side component.

14. The two-component polyurethane or polyisocyanurate spray foam composition of claim 12, wherein the one or more liquid blowing agent in the B-side component is or comprises (E)-1-chloro-3,3,3-trifluoropropene (HFO-1233zd).

15. A method of providing a space filling layer or space filling volume adjacent to or on a surface, the method comprising:
   (a) providing a foamable composition comprising:
      (i) an A-side component comprising one or more polyisocyanate and one or more blowing agent; and
      (ii) a B-side component comprising one or more polyol and one or more blowing agent comprising pressurized gaseous carbon dioxide and one or more liquid blowing agent;
   wherein both the A-side component and the B-side component, separately, generate less than 300 ppm of fluoride ion after one week of aging at 50° C.;
   (b) applying a foamed sample, or pre-foamed sample that generates a foamed sample, of the foamable composition to said surface; and
   (c) allowing the foamed sample of foamable composition to cure to a foam having a density of less than 48 kg/m$^3$.

16. The method of claim 15, wherein the pressurized gaseous carbon dioxide in the B-side component is present at a level of from 0.5 wt. % to 10 wt. % carbon dioxide, based on the total weight of the B-side component.

17. The method of claim 15, wherein the pressurized gaseous carbon dioxide in the B-side component provides a pressure of from 0.14 MPa to 4.00 MPa (21 psig to 580 psig) on the B-side component as measured at ambient temperature.

18. The method of claim 15, wherein the one or more liquid blowing agent in the B-side component is or comprises a hydrohaloolefin.

19. The method of claim 15, wherein the one or more liquid blowing agent in the B-side component is or comprises (E)-1-chloro-3,3,3-trifluoropropene (HFO-1233zd).

20. The method of claim 15, wherein the step of applying the foamed sample is performed by spraying the foamable composition from a pressurized container.

* * * * *